(12) United States Patent
Polonowski et al.

(10) Patent No.: US 10,641,160 B2
(45) Date of Patent: May 5, 2020

(54) CONTROLLED AIR ENTRAINMENT PASSAGE FOR DIESEL ENGINES

(71) Applicant: Ford Global Technologies, LLC, Dearborn, MI (US)

(72) Inventors: Christopher Polonowski, Ann Arbor, MI (US); Eric Matthew Kurtz, Dearborn, MI (US); Daniel William Kantrow, Ann Arbor, MI (US); Jianwen James Yi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 16/114,957

(22) Filed: Aug. 28, 2018

(65) Prior Publication Data

US 2019/0003371 A1    Jan. 3, 2019

Related U.S. Application Data

(63) Continuation of application No. 15/170,561, filed on Jun. 1, 2016, now Pat. No. 10,060,334.

(51) Int. Cl.
*F02B 19/18* (2006.01)
*F02M 67/04* (2006.01)
(Continued)

(52) U.S. Cl.
CPC ........ *F02B 23/0648* (2013.01); *F02B 19/108* (2013.01); *F02B 19/1066* (2013.01);
(Continued)

(58) Field of Classification Search
CPC .... F02M 67/04; F02M 31/20; F02B 19/1066; F02B 19/108; F02B 19/18; F02B 23/0648
(Continued)

(56) References Cited

U.S. PATENT DOCUMENTS 1,759,161 A    5/1930   Lang
3,270,721 A    9/1966   Hideg et al.
(Continued)

FOREIGN PATENT DOCUMENTS

CN    2515430 Y      10/2002
JP    2004308449 A   11/2004
WO    2016012068 A1  1/2016

OTHER PUBLICATIONS

Nilsen, C. et al., "Ducted fuel injection for compression-ignition engines," Sandia National Laboratories, Available Online at https://prod.sandia.gov/techlib-noauth/access-control.cgi/2014/1417364r.pdf, Sep. 1, 2014, 10 pages.

*Primary Examiner* — Erick R Solis
(74) *Attorney, Agent, or Firm* — Geoffrey Brumbaugh; McCoy Russell LLP

(57) ABSTRACT

Systems are provided for cooling combustion chamber gasses and increasing an amount of air entrained in an injected fuel spray. In one example, a cooling passage may be included in an internal combustion engine, the cooling passage positioned exterior to a cylinder bore of the engine and coupled to the cylinder bore at a first opening and a second opening. The cooling passage may receive gasses from the cylinder bore via the first opening, and may cool the gasses as they travel through the cooling passage before returning the gasses to the cylinder bore via the second opening.

20 Claims, 14 Drawing Sheets

(51) Int. Cl.
*F02B 23/06* (2006.01)
*F02B 19/10* (2006.01)
*F02M 31/20* (2006.01)

(52) U.S. Cl.
CPC ............ *F02B 19/18* (2013.01); *F02B 23/063* (2013.01); *F02B 23/0672* (2013.01); *F02M 31/20* (2013.01); *F02M 67/04* (2013.01); *Y02T 10/125* (2013.01); *Y02T 10/126* (2013.01)

(58) Field of Classification Search
USPC ......... 123/41.82 R, 261, 275, 277, 288, 291, 123/316, 532
See application file for complete search history.

(56) References Cited

U.S. PATENT DOCUMENTS

| | | | |
|---|---|---|---|
| 4,351,294 | A | 9/1982 | Giddings |
| 4,413,781 | A | 11/1983 | Iwata |
| 5,771,866 | A | 6/1998 | Staerzl |
| 8,839,762 | B1 | 9/2014 | Chiera et al. |
| 8,967,129 | B2 | 3/2015 | Mueller |
| 9,803,538 | B2 | 10/2017 | Anders et al. |
| 10,494,981 | B2 * | 12/2019 | Perr ..................... F02B 19/12 |
| 2012/0186555 | A1 | 7/2012 | Mueller |
| 2014/0261298 | A1 | 9/2014 | Sasidharan et al. |
| 2016/0069251 | A1 | 3/2016 | Loetz |
| 2016/0348570 | A1 | 12/2016 | Willi |
| 2016/0363041 | A1 | 12/2016 | Moffat et al. |

* cited by examiner

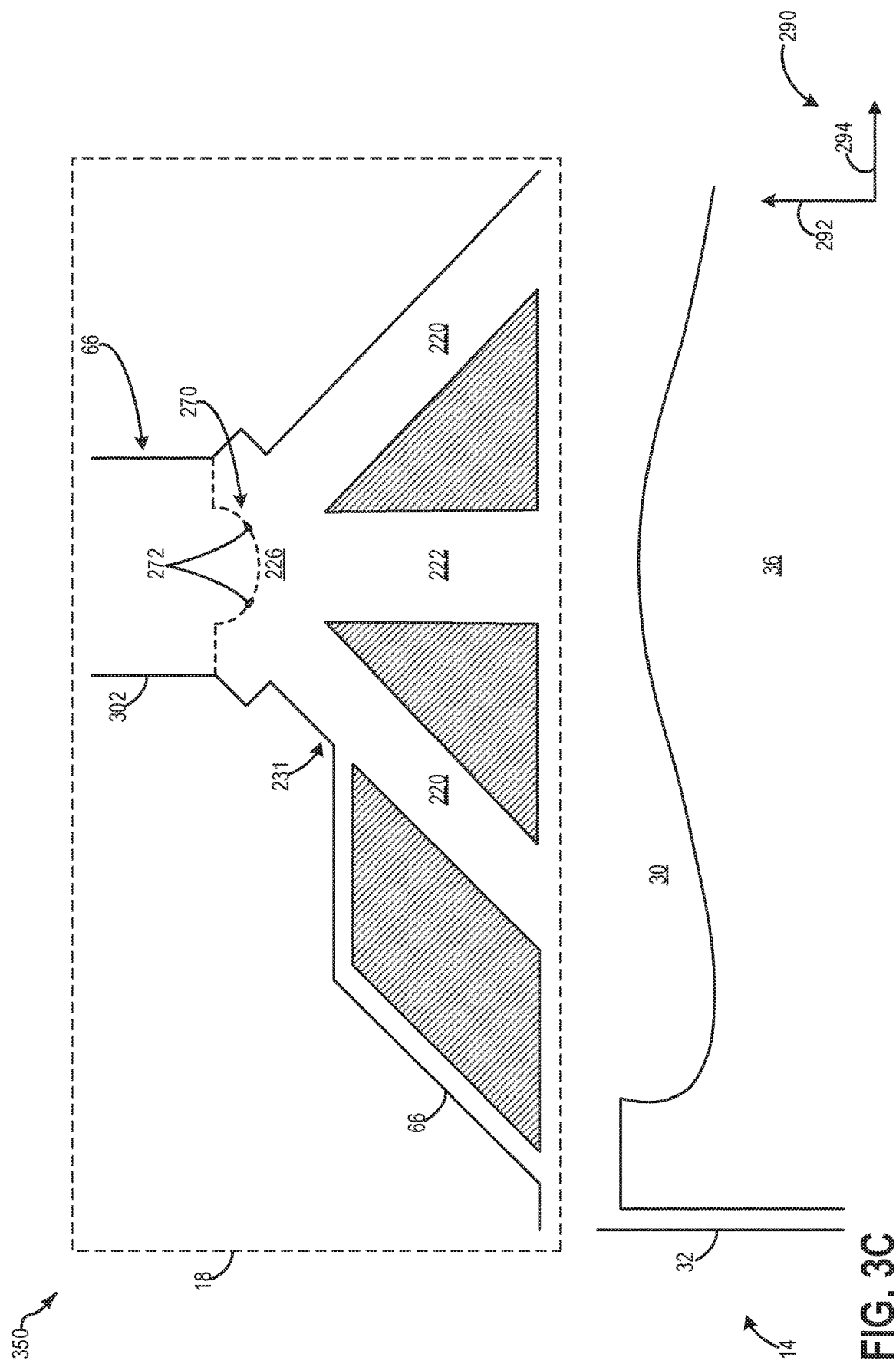

CONTROLLED AIR ENTRAINMENT PASSAGE FOR DIESEL ENGINES

CROSS REFERENCE TO RELATED APPLICATION

The present application is a continuation of U.S. patent application Ser. No. 15/170,561, entitled "CONTROLLED AIR ENTRAINMENT PASSAGE FOR DIESEL ENGINES," filed on Jun. 1, 2016, now U.S. Pat. No. 10,060,334. The entire contents of the above-referenced application are hereby incorporated by reference in its entirety for all purposes.

FIELD

The present description relates generally to systems and methods for fuel injection.

BACKGROUND/SUMMARY

In conventional diesel engines, air is drawn into a combustion chamber during an intake stroke by opening one or more intake valves. Then, during the subsequent compression stroke, the intake valves are closed, and a reciprocating piston of the combustion chamber compresses the gasses admitted during the intake stroke, increasing the temperature of the gasses in the combustion chamber. Fuel is then injected into the hot, compressed gas mixture in the combustion chamber, resulting in combustion of the fuel. Thus, in a diesel engine, the fuel may combust with the air in the combustion chamber due to the high temperature of the air, and may not be ignited via a spark plug as in a gasoline engine. The combusting air-fuel mixture pushes on the piston, driving motion of the piston, which is then converted into rotational energy of a crankshaft.

However, the inventors herein have recognized potential issues with such diesel engines. As one example, diesel fuel may not mix evenly with the air in the combustion chamber, leading to the formation of dense fuel pockets in the combustion chamber. These dense regions of fuel may produce soot as the fuel combusts. As such, conventional diesel engines include particulate filters for reducing soot and other particulate matter in their emissions. However, such particulate filters lead to increased cost and increased fuel consumption.

In one example, the issues described above may be addressed by a cooling passage for an internal combustion engine, the cooling passage positioned exterior to a cylinder bore and wherein the cooling passage may be coupled to the cylinder bore at a first opening for receiving gasses from the cylinder bore, and where the cooling passage may be further coupled to the cylinder bore at a second opening for returning the gasses received from the cylinder bore via the first opening, back to the cylinder bore. In this way, a temperature of the gasses in the combustion chamber with which injected fuel initially mixes may be reduced by flowing the gasses out of the combustion chamber. By reducing the temperature of the gasses with which the injected fuel initially mixes, and amount of time and/or a distance over which the injected fuel and air mix prior to combustion may be increased, thus reducing particulate and/or soot production.

In another representation, the issues described above may be addressed by a method comprising admitting intake gasses from an intake manifold into a combustion chamber during an intake stroke via opening one or more intake valves, and flowing at least a portion of the intake gasses out of the combustion chamber and into a mixing passage fluidly coupled to the combustion chamber during a compression stroke. By flowing the intake gasses out of the combustion chamber during the compression stroke a temperature of the gasses with which injected fuel initially mixes may be reduced. By increasing cooling of the gasses with which injected fuel initially mixes, an amount of air and fuel mixing prior to combustion may be increased. Thus, the lift-off length and/or air entrainment of fuel may be increased, and thus soot production may be reduced during the combustion cycle.

In another representation, the issues described above may be addressed by an engine comprising a combustion chamber and a heat dissipation conduit, where the heat dissipation conduit may be fluidly coupled to the combustion chamber and positioned exterior to the combustion chamber for flowing gasses in the combustion chamber out and away from the combustion chamber towards a fuel injector. In the above example engine, the heat dissipation conduit may be coupled at a first end to a fire deck of the combustion chamber, where the first end may form a first opening in the fire deck that provides fluidic communication between the combustion chamber and the heat dissipation conduit.

In another representation, an engine may comprise a combustion chamber, an intake manifold fluidly communicating with the combustion chamber via one or more intake valves, an exhaust manifold fluidly communicating with the combustion chamber via one or more exhaust valves, a fuel injector, and a mixing passage coupled and open to the combustion chamber for receiving gasses from the combustion chamber, the mixing passage positioned exterior to the combustion chamber. In some examples, the mixing passage may include a cooled air conduit and a fuel spray conduit, where the cooled air conduit may be coupled at a first end to the combustion chamber, and at an opposite second end to the fuel spray conduit for directing gasses from the combustion chamber to the fuel spray conduit. The fuel spray conduit may be coupled at a first end to the combustion chamber, and at an opposite second end to the fuel injector for directing fuel injected by the fuel injector from the fuel injector to the combustion chamber via the second opening.

In this way, a temperature of gasses in the combustion chamber with which injected fuel initially mixes may be reduced by flowing the gasses out of the combustion chamber. The gasses may dissipate heat to the surrounding environment, such as to a cylinder head and/or ambient air. By reducing the temperature of the gasses with which the injected fuel initially mixes, and amount of time and/or a distance over which the injected fuel and air mix prior to combustion may be increased, thus leading to an increased amount of air entrained by the fuel prior to combustion. A more thorough and even mixing of the fuel and air may thus lead to reduced particulate matter and/or soot production. In this way, the frequency at which a particulate matter filter is regenerated may be reduced, thus reducing fuel consumption. In some examples, soot and particulate matter may be reduced to sufficiently low levels such that a particulate matter filter may not be included in the engine, thus reducing the cost of the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

BRIEF DESCRIPTION OF THE DRAWINGS

FIG. 3C shows an exploded, side, cross-sectional view of the fuel-air mixing chamber of FIG. 1, in accordance with an embodiment of the present disclosure.

DETAILED DESCRIPTION

The following description relates to systems and methods for injecting fuel into an engine cylinder. In particular, the following description relates to systems and methods for injecting diesel fuel. An engine system, such as the engine system shown in FIG. 1, may comprise one or more engine cylinders, each comprising at least one fuel injector. The fuel injectors may be direct injectors that inject fuel directly into the engine cylinders. However, when injected directly into the cylinders, diesel fuel may not mix evenly with the air in the cylinders, leading to pockets in the cylinders of denser and/or less oxygenated fuel where soot may be produced during the combustion cycle.

To reduce the amount of soot produced by an engine, cooled-air passages may be included in the engine. The cooled-air passages may cool gasses in the combustion chambers, prior to fuel injection to the combustion chambers. Specifically, the cooled-air passages may be positioned exterior to, and in fluidic communication with, the combustion chambers. In this way, gasses from a combustion chamber may flow out of the combustion chamber and through a cooled-air passage, dissipating heat to the environment exterior to the combustion chamber. After being cooled in the cooled-air passage, gasses may return to the combustion chambers and/or mix with injected fuel.

Figure 5:
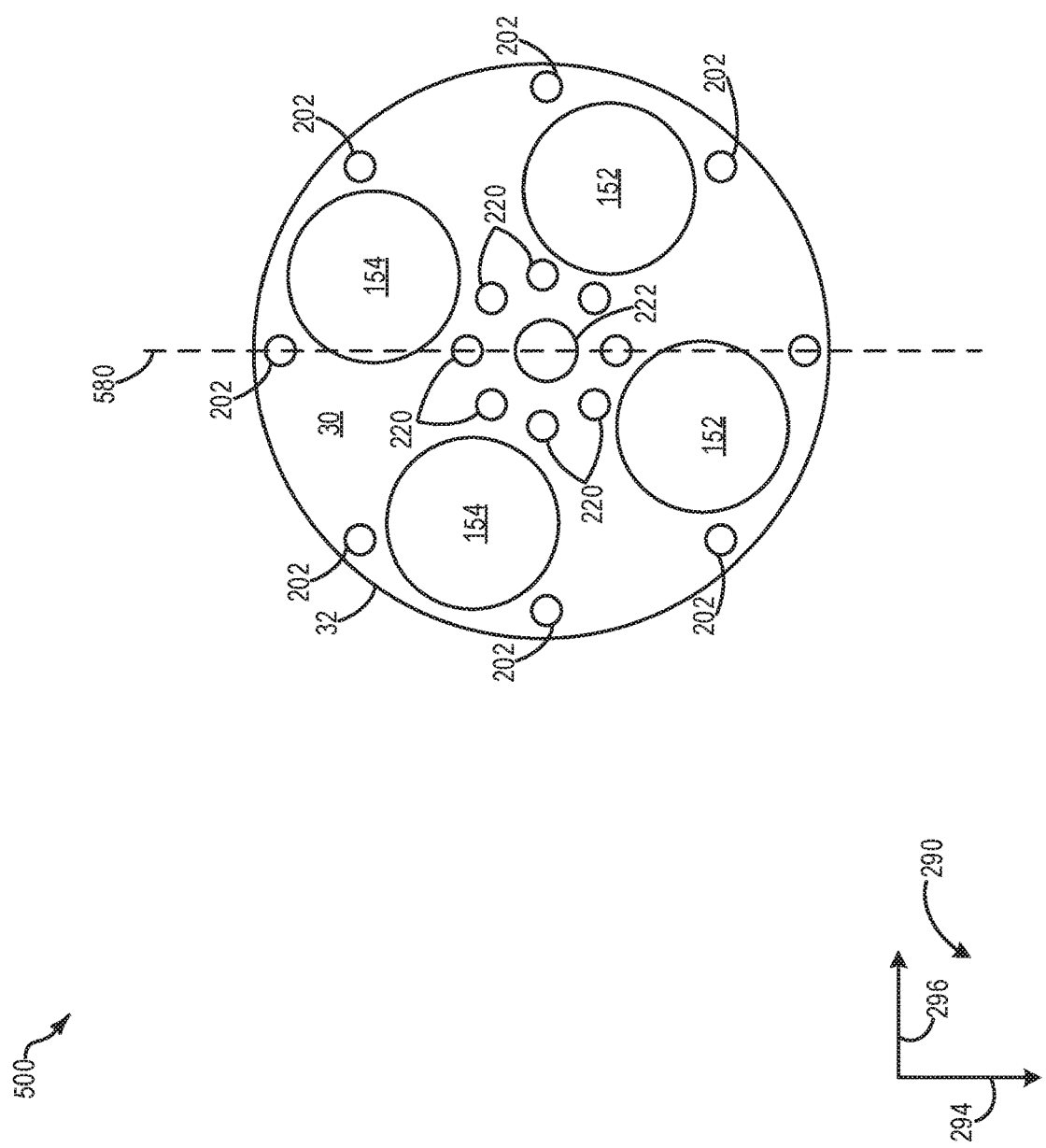
FIG. 5 shows a top, cross-sectional view of a cylinder of an engine system including the fuel-air mixing chamber of FIG. 1, in accordance with an embodiment of the present disclosure.

In some examples, such as described in FIGS. 2A-3C, the cooled-air passages may be included between the fuel injectors and the combustion chambers. However, in other examples, such as described in FIGS. 6-7, the cooled-air passages may be positioned adjacent to the fuel injectors. Further, the cooled-air passages may be included above the combustion chambers, proximate the cylinder head, as shown in the example of FIG. 5. However, in other examples, such as is described in FIG. 8, the cooled-air passages may be included on the side of the combustion chambers, such as in an opposed piston engine.

Air in the combustion chambers may pass through the cooled-air passages, and may dissipate heat to the cylinder head and surrounding environment. By pre-cooling the air with which the injected fuel initially mixes, a more thorough and even mixing of the fuel and air may be achieved prior to combustion. In particular, the lift-off length, a term commonly used by those skilled in the art to describe the distance between the fuel spray and the combustion flame, may be increased. By reducing the temperature of gasses in the cooled-air passages relative to the temperature of gasses in the combustion chamber, combustion may be delayed, and the air and injected fuel may have more time to mix. As such, more air may be entrained by the fuel prior to combustion. Said another way, due to the lower temperature of the combustion chamber gasses, the diesel fuel and gasses from the cooled-air passages may mix for a greater duration and/or over a greater distance, prior to combustion. Thus, the time and/or distance to combustion from the point of fuel injection may be extended by cooling the gasses with which the fuel initially mixes, resulting in a more complete mixing of the fuel and air. Thus, combustion may be delayed and air entrainment of the fuel may be increased, leading to a more complete and soot-free combustion.

Figure 1:
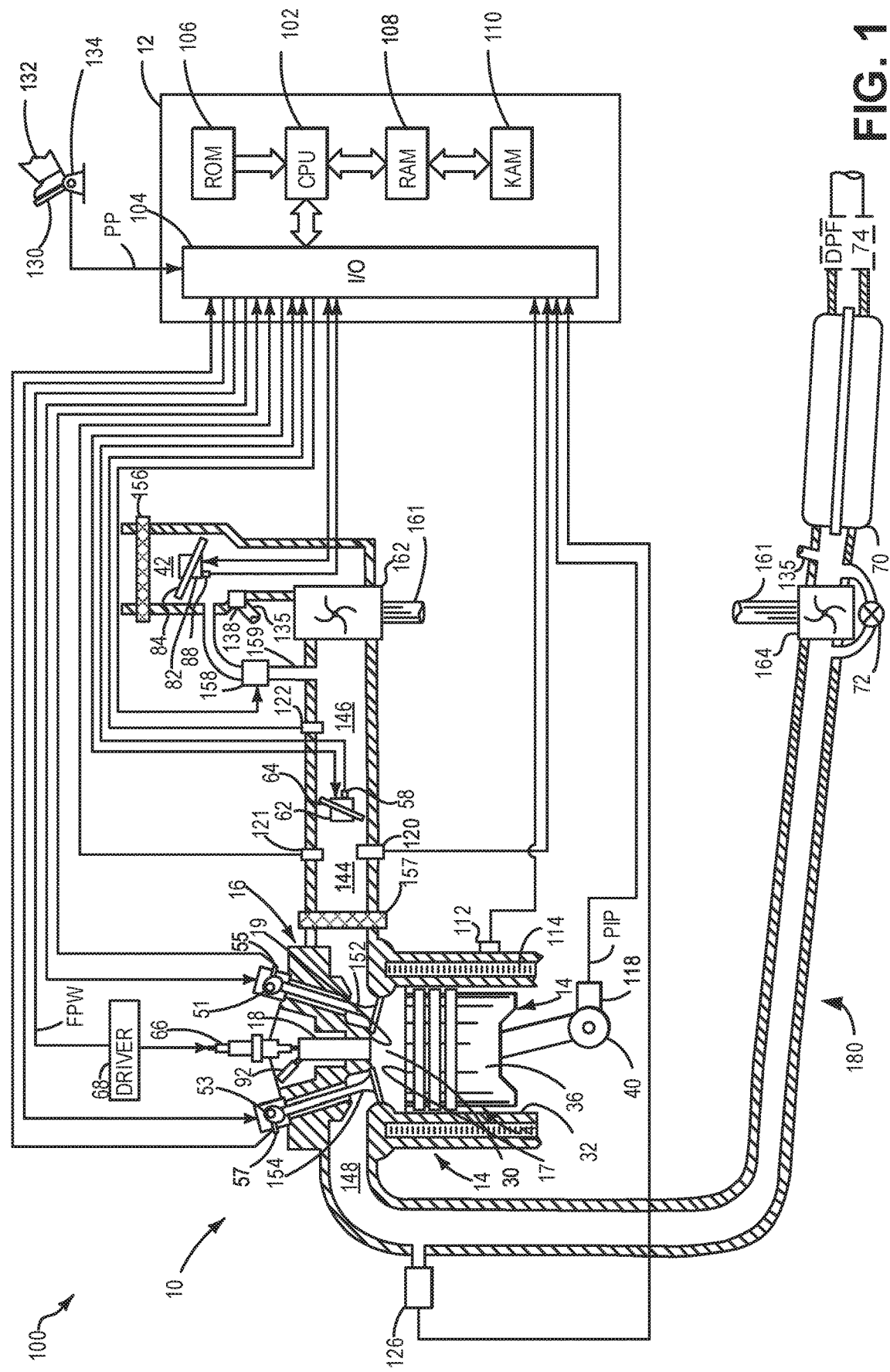
FIG. 1 shows a schematic diagram of an example engine system including a fuel-air mixing chamber, in accordance with an embodiment of the present disclosure.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. The cylinder bore 20 may be defined as the volume enclosed by the cylinder walls 32. The cylinder head 16 may be coupled to the cylinder block 14, to enclose the cylinder bore 20. Thus, when coupled together, the cylinder head 16 and cylinder block may form one or more combustion chambers. In particular, combustion chamber 30 may be the volume included between a top surface 17 of the piston 36 and a fire deck 19 of the cylinder head 16. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gasses may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, one or more exhaust valves such as exhaust valves 154, and in some examples, a fuel-air mixing passage 18. The cylinder head 16 may be coupled to the cylinder block 14 via fasteners, such as bolts and/or screws. In particular, when coupled, the cylinder block 14 and cylinder head 16 may be in sealing contact with one another via a gasket, and as such may the cylinder block 14 and cylinder head 16 may seal the combustion chamber 30, such that gasses may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

The cylinder walls 32, piston 36, and cylinder head 16 may thus form the combustion chamber 30, where a top surface 17 of the piston 36 serves as the bottom wall of the combustion chamber 30 while an opposed top surface or fire deck 19 of the cylinder head 16 forms the top wall of the combustion chamber 30. Thus, the combustion chamber 30 may be the volume included within the top surface 17 of the piston 36, cylinder walls 32, and fire deck 19 of the cylinder head 16.

Fuel injector 66 may be positioned to inject fuel directly into combustion chamber 30, which is known to those skilled in the art as direct injection. Alternatively, fuel may be injected to an intake port, which is known to those skilled in the art as port injection. In yet further examples, and as shown in FIG. 1, the fuel injector 66 may be positioned to inject fuel into a mixing passage 18 positioned between the fuel injector 66 and combustion chamber 30. Thus, fuel may flow from the injector 66 through the mixing passage 18, and then into the combustion chamber 30. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a diesel engine, and the fuel tank may include diesel fuel, which may be injected by injector 66 into the combustion chamber 30. However, in other examples, the engine 10 may be a gasoline engine, and the fuel tank may include gasoline fuel, which may be injected by injector 66 into the combustion chamber. Further, in such examples where the engine 10 is configured as a gasoline engine, the engine 10 may include a spark plug to initiate combustion in the combustion chamber 30.

In some examples, fuel-air mixing passage 18 may be included to reduce the temperature of air that is entrained by the fuel injected from the injector 66. Specifically, when fuel exits the injector 66 during fuel injection, it may travel a distance while mixing with ambient gasses in the fuel-air mixing passage 18 before combusting. In the description herein, the distance the fuel spray travels before combusting may be referred to as the "lift-off length." In particular, the lift-off length may refer to the distance the injected fuel travels before the combustion process begins. Thus, the lift-off length may be a distance between an orifice of the injector 66 from which the fuel exits the injector 66, to a point in the combustion chamber 30 at which combustion of the fuel generates more than a threshold concentration of $OH^+$.

The fuel-air mixing passage 18 may decrease the temperature of the gasses that mix with the fuel prior to combustion in the combustion chamber 30. In this way, the lift-off length of the fuel spray may be increased and/or an amount of air entrainment in the fuel spray may be increased. The fuel-air mixing passage 18 may be positioned exterior to the combustion chamber 30, but may be in fluidic communication with combustion chamber 30, such that gasses in the combustion chamber 30 may enter the mixing passage 18 and be recirculated back into the combustion chamber 30. As one example, intake air introduced into the combustion chamber 30 during an intake stroke, may be pushed into the mixing passage 18 during all or a portion of the compression stroke. However, in other examples, the mixing passage 18 may be positioned within combustion chamber 30. In yet further examples, the mixing passage 18 may be partially positioned exterior to the combustion chamber 30, such that at least a portion of the mixing passage 18 may be positioned within the combustion chamber 30.

In some examples, such as in the example of FIG. 1, the mixing passage 18 may be positioned vertically above the combustion chamber 30 with respect to the ground when coupled in an on-road vehicle. However, in other examples, such as in the example of FIG. 7, the mixing passage 18 may be positioned exterior to a side of the combustion chamber 30, or bottom of the combustion chamber 30. In some examples, substantially all of the mixing passage 18 may be positioned exterior to the combustion chamber 30 such that no portion of the mixing passage 18 extends into the combustion chamber 30. However, in other examples, a portion of the mixing passage 18 may extend into the combustion chamber 30.

In some examples, the fuel-air mixing passage 18 may be included within the cylinder block 14. In particular, the mixing passage 18 may be integrally formed at a top of the cylinder block 14. However, in other examples, the mixing passage 18 may be included within the cylinder head 16. In particular, the mixing passage 18 may be integrally formed within the cylinder head 16 as one or more hollow passages coupling a tip of the injector 66 to the combustion chamber 30. In yet further examples, the mixing passage 18 may be included within the injector 66. In particular, the mixing passage 18 may be integrally formed with a body of the injector 66, forming a portion of the housing or exterior walls of the injector 66. In still further examples, the mixing passage 18 may be a separate component, and may be physically coupled to one or more of the cylinder block 14 and/or cylinder head 16. As another example, portions of the mixing passage 18 may be integrally formed within the cylinder block 14, while other portions of the mixing passage 18 may be integrally formed within the cylinder head 16.

In some examples, such as the example shown in FIG. 1, the mixing passage 18 may be positioned between the fuel injector 66 and the combustion chamber 30. Thus, fuel injected by the injector 66 may pass through the mixing passage 18, before entering the combustion chamber 30. In particular, the injector 66, may be coupled to a top of the mixing passage 18, the top of the mixing passage 18 opposite a bottom of the mixing passage 18, where the bottom of the mixing passage 18 may be open to the combustion chamber 30. For example, as depicted below with reference to FIGS. 2A-2D, the bottom of the mixing passage 18 may be flush with the fire deck 19 of the cylinder head 16, and/or may integrally form a portion of the fire deck 19. As such, fuel may be injected from the injector 66, and may exit the injector 66, from a position vertically above the combustion chamber 30 and cylinder block 14, and vertically above the fire deck 19 of the cylinder head 16.

However, in other examples, such as the example shown below with reference to FIGS. 6-7, the mixing passage 18 may not be positioned between the injector 66 and the combustion chamber 30, and may instead be positioned adjacent to the injector 66. Thus, in such examples, the injector 66 may be in direct fluidic communication with combustion chamber 30, and fuel from the injector 66 may pass directly into the combustion chamber 30 from one or more orifices of the injector 66 without passing through the mixing passage 18. For example, a tip of the injector 66 including one or more injection orifices may extend into the combustion chamber 30.

A glow plug 92 may additionally be included to heat fuel injected by the fuel injector 66 to increase combustion during for example, an engine start or engine cold start. In some examples, such as examples where the mixing passage 18 is included between the fuel injector 66 and the combustion chamber 30, the glow plug 92 may be coupled to the mixing passage 18, and may extend into the mixing passage 18. In other examples, the glow plug 92 may be coupled to the combustion chamber 30, and may extend into the combustion chamber 30.

Intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gasses through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Emission control device may be a catalytic converter and as such may also be referred to herein as catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example. While the depicted example shows UEGO sensor 126 upstream of turbine 164, it will be appreciated that in alternate embodiments, UEGO sensor may be positioned in the exhaust manifold downstream of turbine 164 and upstream of convertor 70.

In some examples, a diesel particulate filter (DPF) 74 may be coupled downstream of the emission control device 70 to trap soot. The DPF 74 may be manufactured from a variety of materials including cordierite, silicon carbide, and other high temperature oxide ceramics. The DPF 74 may be periodically regenerated in order to reduce soot deposits in the filter that resist exhaust gas flow. Filter regeneration may be accomplished by heating the filter to a temperature that will burn soot particles at a faster rate than the deposition of new soot particles, for example, 400-600° C.

However, in other examples, due to the inclusion of mixing passage 18, DPF 74 may not be included in the engine 10. Thus, by including the mixing passage 18, a temperature of the gasses that initially contact the injected fuel may be reduced, thus increasing an amount of air entrained by the fuel in the mixing passage 18 prior to combustion in the combustion chamber 30. As such soot production during the combustion cycle may be reduced. In some examples, soot levels may be reduced to approximately zero due to the increased commingling of fuel and air prior to combustion/ignition of the mixture in the combustion chamber 30. As such, approximately no soot (e.g., zero soot) may be produced by engine 10 during the combustion cycle in some examples. In other examples, due to the inclusion of mixing passage 18, soot production may be reduced and as such, the DPF 74 may be regenerated with less frequency, reducing fuel consumption.

During the combustion cycle, each cylinder within engine 10 may undergo a four stroke cycle including: an intake stroke, compression stroke, power stroke, and exhaust stroke. During the intake stroke and power stroke, the piston 36 moves away from the cylinder head 16 towards a bottom of the cylinder increasing the volume of included between the top of the piston 36 and the fire deck 19. The position at which piston 36 is near the bottom of the cylinder and at the end of its intake and/or power strokes (e.g., when combustion chamber 30 is at its largest volume) is typically referred to by those of skill in the art as bottom dead center (BDC). Conversely, during the compression and exhaust strokes, the piston 36 moves away from BDC towards a top of the cylinder (e.g., fire deck 19), thus decreasing the volume of included between the top of the piston 36 and the fire deck 19. The position at which piston 36 is near the top of the cylinder and at the end of its compression and/or exhaust strokes (e.g., when combustion chamber 30 is at its smallest volume) is typically referred to by those of skill in the art as top dead center (TDC). Thus, during the intake and power strokes, the piston 36 moves from TDC to BDC, and during the compression and exhaust strokes, the piston 36 moves from BDC to TDC.

Further, during the intake stroke, generally, the exhaust valves 154 close and the intake valves 152 open to admit intake air into the combustion chamber 30. During the compression stroke, both valves 152 and 154 may remain closed, as the piston 36 compresses the gas mixture admitted during the intake stroke. During the compression stroke, gasses in the combustion chamber 30 may be pushed into the mixing passage 18 due to the positive pressure created by the piston 36 as it travels towards the mixing passage 18. The gasses from the combustion chamber 30 may dissipate heat through one or more of the cylinder head 16 and ambient air via conduction and/or convention. As such, the temperature of the gasses in the mixing passage 18 may be reduced relative to the temperature of the gasses in the combustion chamber 30.

When the piston 36 is near or at TDC during the compression and/or power stroke, fuel is injected into the combustion chamber 30 by injector 66. During the ensuing power stroke, the valves 152 and 154 remain closed, as the expanding and combusting fuel and air mixture pushes the piston 36 towards BDC. In some examples, fuel may be injected prior to the piston 36 reaching TDC, during the compression stroke. However, in other examples, fuel may be injected when the piston 36 reaches TDC. In yet further examples, fuel may injected after the piston 36 reaches TDC and begins to translate back towards BDC during the power stroke. In yet further examples, fuel may be injected during both the compression and power strokes.

Fuel may be injected over a duration. An amount of fuel injected and/or the duration over which fuel is injected may be varied via pulse width modulation (PWM) according to one or more linear or non-linear equations. Further, the injector 66 may include a plurality of injection orifices, and an amount of fuel injected out of each orifice may be varied as desired.

During the exhaust stroke, the exhaust valves 154 may open to release the combusted air-fuel mixture to exhaust manifold 148 and the piston 36 returns to TDC. Exhaust gasses may continue to flow from the exhaust manifold 148, to the turbine 164 via exhaust passage 180.

Both the exhaust valves 154 and the intake valves 152 may be adjusted between respective closed first positions and open second positions. Further, the position of the valves 154 and 152 may be adjusted to any position between their respective first and second positions. In the closed first position of the intake valves 152, air and/or an air/fuel mixture does not flow between the intake manifold 144 and the combustion chamber 30. In the open second position of the intake valves 152, air and/or an air/fuel mixture flows between the intake manifold 144 and the combustion chamber 30. In the closed second position of the exhaust valves 154, air and/or an air fuel mixture does not flow between the combustion chamber 30 and the exhaust manifold 148. However, when the exhaust valves 154 is in the open second position, air and/or an air fuel mixture may flow between the combustion chamber 30 and the exhaust manifold 148.

Note that the above valve opening and closing schedule is described merely as an example, and that intake and exhaust valve opening and/or closing timings may vary, such as to provide positive or negative valve overlap, late intake valve closing, or various other examples.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hell effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

Figure 2A:
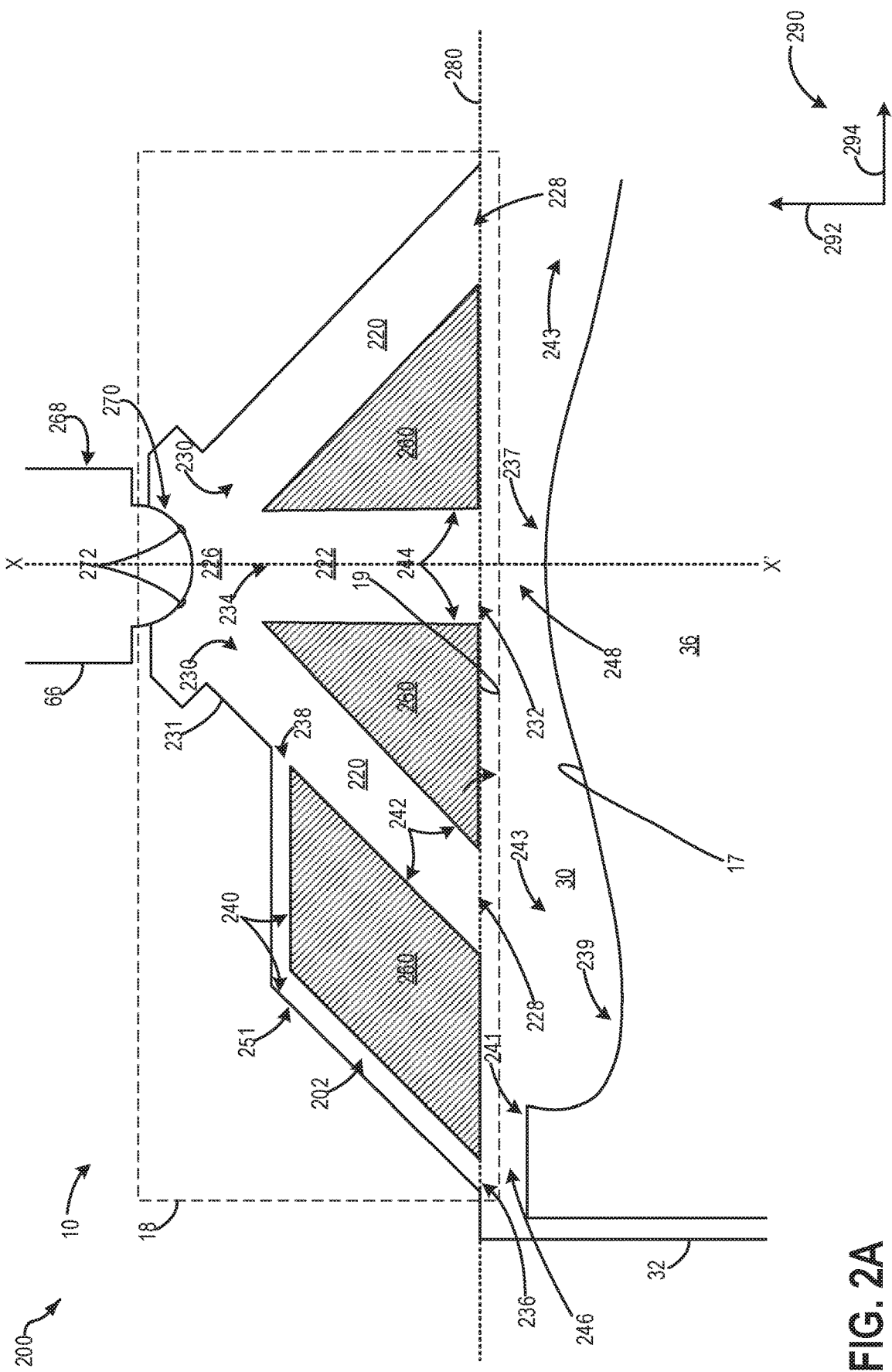
FIG. 2A shows a side, cross-sectional view of the fuel-air mixing chamber of FIG. 1, in accordance with an embodiment of the present disclosure.

Turning now to FIGS. 2A-8, they show various embodiments of the mixing passage 18 that may be included in an engine such as the engine 10 described above with reference to FIG. 1. FIGS. 2A-2D show cross-sectional views of the mixing passage 18, illustrating conduits that may be included within the mixing passage 18. Further, FIGS. 3A-3C show various embodiments of how the mixing passage 18 may be coupled within the engine 10. FIGS. 2A-3C show cross-sectional views of the mixing passage 18 and top portion of the combustion chamber 30, taken along a diameter of the combustion chamber 30. Further, FIGS. 2A-3C may only show a portion of the combustion chamber 30 along the diameter. A central axis X-X' is shown in FIG. 2A, and may pass through a center of the combustion chamber 30 along the vertical axis 292. Thus, the central axis X-X' may be the central axis of the combustion chamber 30.

Figure 4:
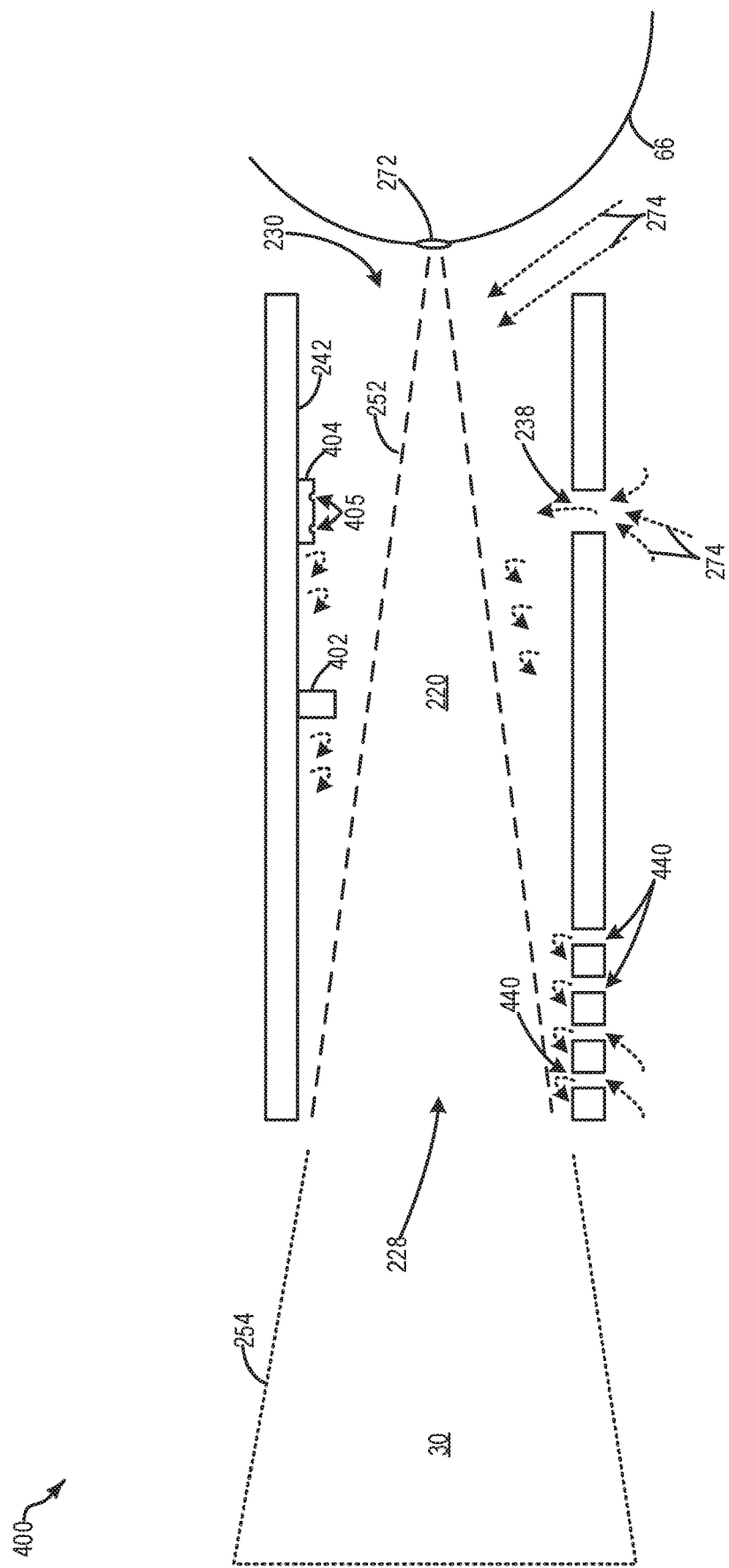
FIG. 4 shows a cross-sectional view of the fuel-air mixing chamber of FIG. 1, including various interior surface features, in accordance with an embodiment of the present disclosure.
Figure 6:
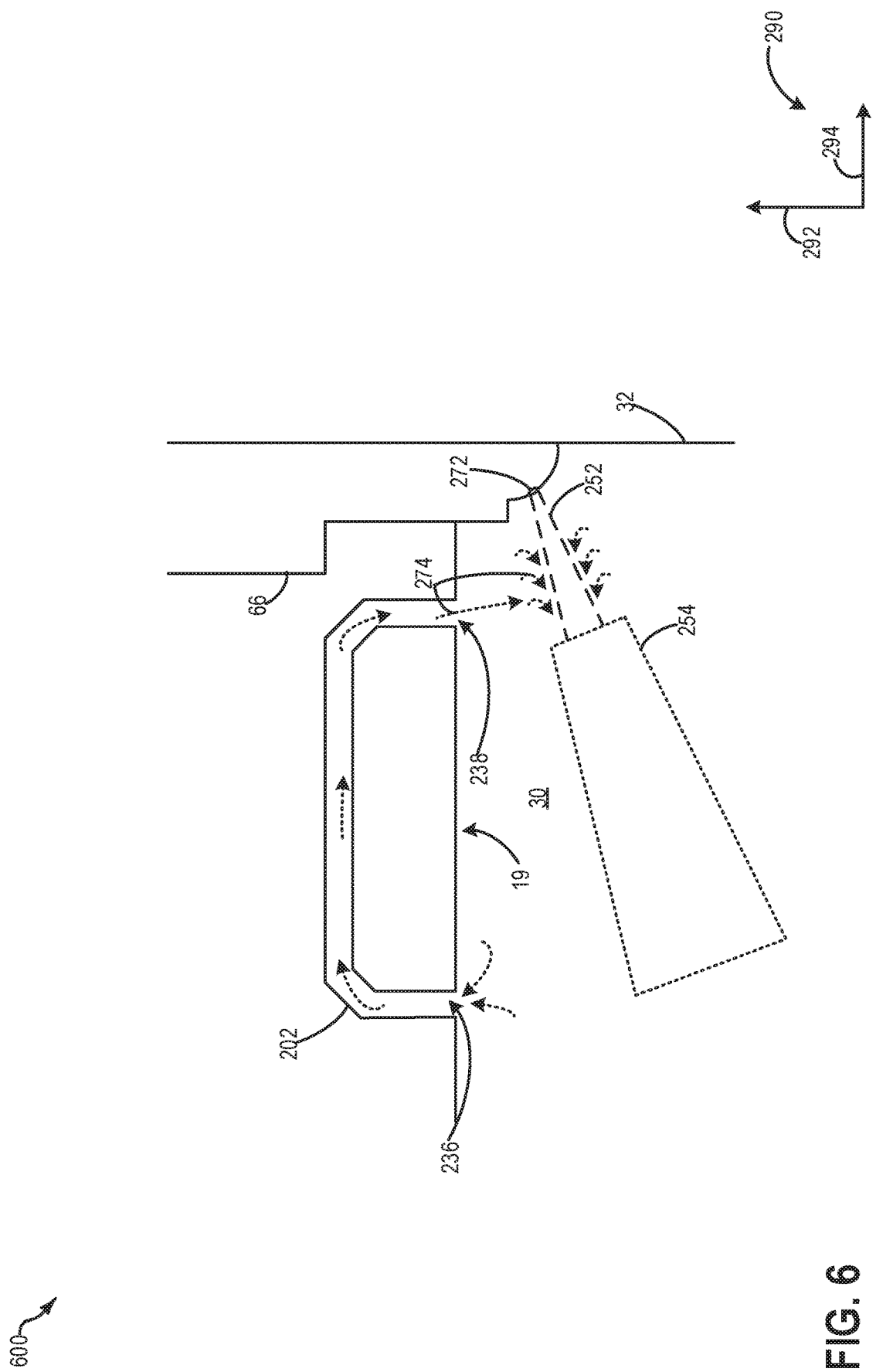
FIG. 6 shows a side, cross-sectional view of the fuel-air mixing chamber of FIG. 1, in accordance with an embodiment of the present disclosure.
Figure 7:
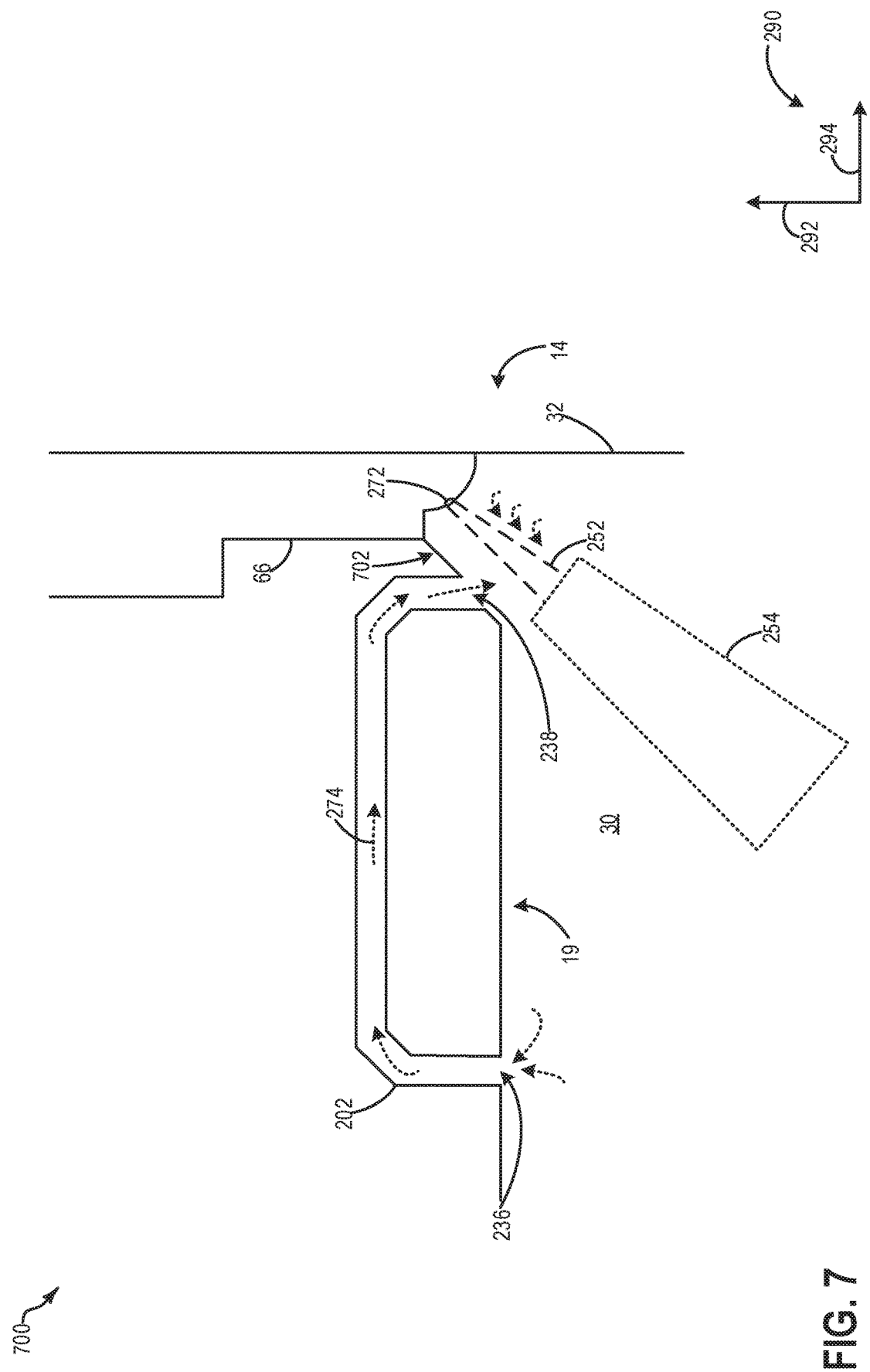
FIG. 7 shows a side, cross-sectional view of the fuel-air mixing chamber of FIG. 1, in accordance with an embodiment of the present disclosure.
Figure 8:
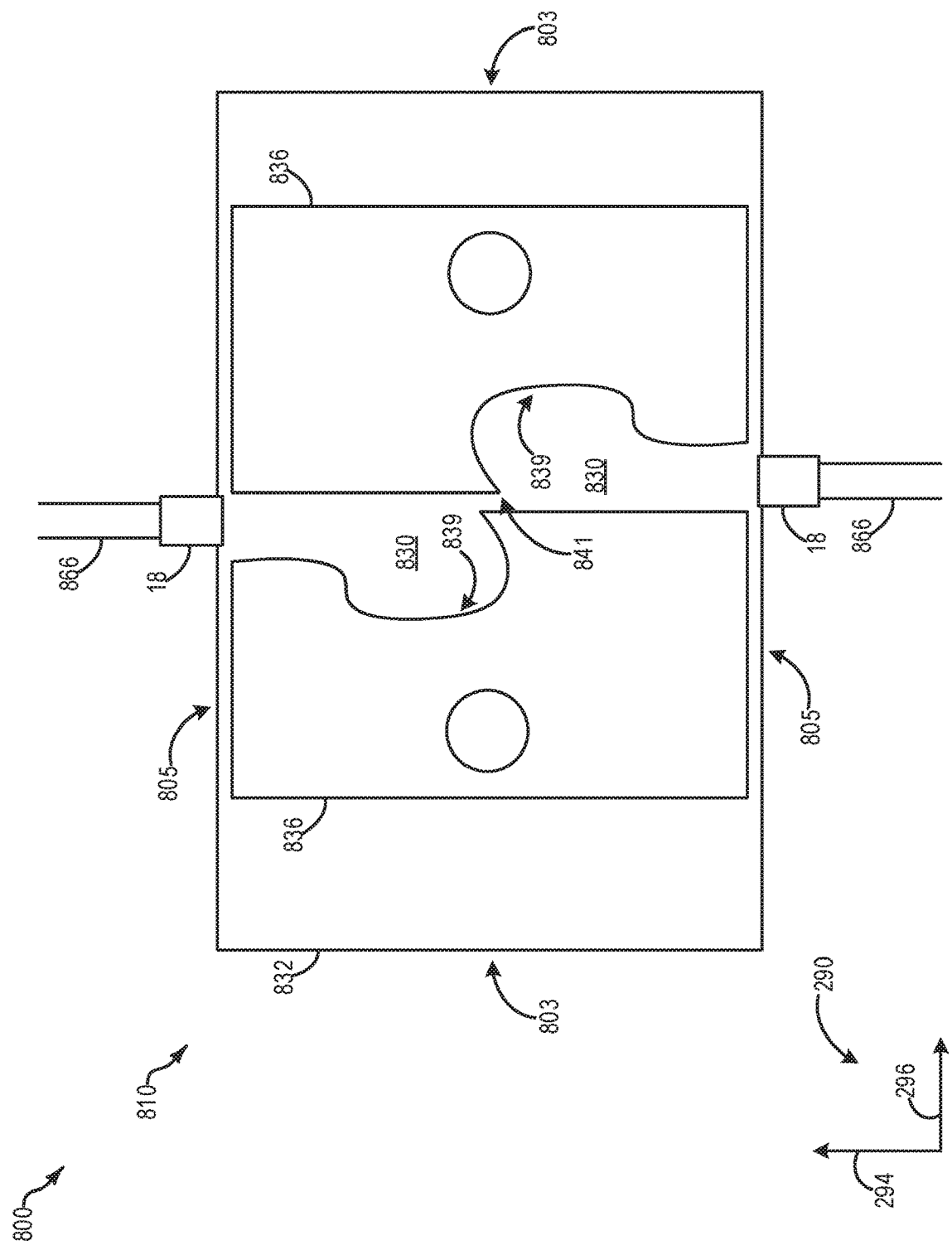
FIG. 8 shows a top, cross-sectional view of a fuel-air mixing chamber that may be included in an opposed piston engine, in accordance with an embodiment of the present disclosure.

FIG. 4 shows an example of surface features that may be included in the mixing passage 18, FIG. 5 shows a top, cross-sectional view of the mixing passage 18, and FIGS. 6-7 show examples where the mixing passage 18 is positioned adjacent to the injector 66, where the injector may be partially disposed within the combustion chamber 30. FIG. 8 shows an example of the mixing passage 18 included in an opposed piston engine.

FIGS. 2A-8 may include an axis system 290 which may be used to describe the relative positioning of components of the engine system. The axis system 290 may include a vertical axis 292, a lateral axis 294, and a longitudinal axis 296. The axes 292, 294, and 296 may be orthogonal to one another, thereby defining a three-dimensional axis system. As used herein, "top/bottom", "upper/lower", and "above/below", may be relative to the vertical axis 292 and may be used to describe the positioning of elements of the figures relative to one another along the vertical axis 292. Thus, a first component described as "vertically above" a second component may be positioned vertically above the second component relative to the vertical axis 292 (e.g., in a positive direction along axis 292 relative to the second component). Similarly, "to the left/right of," and "to the side of" may be used to describe the positioning of elements of the figures relative to one another along the lateral axis 294 and may be used to describe the positioning of elements of the figures relative to one another along the lateral axis 294. Further, "in front of," and "behind" may be relative to the longitudinal axis 296 and may be used to describe the positioning of element of the figures relative to one another along the longitudinal axis 296.

Focusing on FIG. 2A, it shows a first side cross-sectional view 200 of the mixing passage 18, which may be included in engine 10, described above with reference to FIG. 1. As depicted in FIG. 2A, the mixing passage 18 may be positioned exterior to the combustion chamber 30, but may be in fluidic communication with the combustion chamber 30 via one or more openings in the fire deck 19. Further, the mixing passage 18 may be positioned vertically above the combustion chamber 30 with respect to the vertical axis 292. Thus, in some examples, the entirety of the mixing passage 18 may be positioned vertically above the combustion chamber 30, such that no portion of the mixing passage 18 extends into the combustion chamber 30. Thus, the mixing passage 18 may be positioned vertically above the piston 36 during the entire combustion cycle, such that the mixing passage 18 is vertically above the piston 36 at TDC and BDC, and any position there-between.

In other examples, a portion of the mixing passage 18 may extend into the combustion chamber 30. It should be appreciated that in the example of FIG. 2A, the sides of the piston 36 are depicted as being separated from the cylinder walls 32 by a gap to illustrate that the cylinder walls 32 and piston 36 are distinct elements and that the piston 36 moves relative to the cylinder walls 32. However, it should be appreciated that the piston 36 may be in sealing contact with the cylinder walls 32, and that substantially no combustion chamber gasses may be present between the sides of the piston 36 and the cylinder walls 32. Thus, the combustion chamber gasses may be contained to the volume included above the piston 36, between the piston 36, and the fire deck 19.

The mixing passage 18 be in fluidic communication with the combustion chamber 30, such that gasses may flow between the combustion chamber 30 and the mixing passage 18. In particular, gasses in the combustion chamber 30 may flow out of the combustion chamber 30 and into the mixing passage 18. Gasses entering the mixing passage 18 from the combustion chamber 30 may flow through the mixing passage 18, and/or back into the combustion chamber 30. Thus, the mixing passage 18 may recirculate gasses from the combustion chamber 30 back into the combustion chamber 30. In particular the mixing passage 18 may comprise a cooled air conduit 202 that may cool (e.g., remove heat from) the combustion chamber gasses as they are recirculated through the mixing passage 18. The mixing passage 18 may include more than one cooled air conduit, in some examples. As such, the cooled air conduit 202 may also be referred to herein as heat dissipation conduit 202.

Gasses in the combustion chamber 30 may be admitted into the combustion chamber 30 via one or more of intake valves (e.g., intake valves 152 described above with reference to FIG. 1) and/or exhaust valves (e.g., exhaust valves 154 described above with reference to FIG. 1). As one example, during an intake stroke, one or more of the intake valves may open and intake gasses may be admitted into the combustion chamber 30 as the piston 36 translates towards BDC. Then, during the subsequent compression stoke the intake and exhaust valves may remain closed, and the piston 36 may compress the gasses admitted during the intake stroke as the piston 36 translates back towards TDC. A portion or all of the gasses in the combustion chamber 30 may be pushed into the mixing passage 18 by the piston 36, as the piston 36 translates towards TDC and the mixing passage 18.

In particular, the top surface 17 of the piston 36 may have a non-uniform geometry. Said another way, the top surface 17 of the piston 36 may not be flat or planar, and may instead be curved. However, in other examples, the top surface 17 of the piston 36 may be flat/planar. As shown in the example of FIG. 2A, the top surface 17 of the piston 36 may be curved such that it forms peaks and valleys, where the peaks may be more proximate the fire deck 19 than the valleys. Specifically, the top surface 17 of the piston 36 may comprise a central pip 237 that may comprise one of the peaks. The pip 237 that may be centrally positioned on the piston 36 relative to a central axis of the piston 36. Further, around an outer edge or perimeter of the top surface 17 of piston 36, an outer lip 241 may be formed. Between the lip 241 and the pip 237, a bowl 239 may be formed that is depressed relative to the lip 241 and pip 237. Thus, the bowl 239 may form the valley that is recessed relative to the lip 241 and pip 237, and thus is separated from the fire deck 19 by a greater distance than the pip 237 and lip 241. It should be appreciated that other curved piston bowl geometries may be used as desired.

In some examples, the pip 237 may be positioned more proximate the fire deck 19 than the lip 241. Thus, the top of the pip 237 may extend vertically above the lip 241. However, in other examples, the pip 237 may be positioned approximately equidistant from the fire deck 19 as the lip 241. In yet further examples, the lip 241 may be positioned more proximate the fire deck 19 than the pip 237, and as such the top of the pip 237 may be vertically below the lip 241.

Thus, the piston 36 may be approximately cylindrical, and as such, the top surface 17 of the piston 36 may be approximately circular. Further, the top surface 17 may be recessed between the lip 241 of the piston 36, forming the bowl 239. As such, the distance between the fire deck 19 and the top surface of the piston 36 may be less at the pip 237 and lip 241 than at the bowl 239. The cooled air conduit 202 may be positioned vertically above and/or over the lip 241 of the piston 36. The volume of the combustion chamber 30 included between the lip 241 of the piston 36 and the cooled air conduit 202 may be a first squish region 246. The cooled air conduit 202 may be coupled and/or open to the combustion chamber 30 at a first end 236 and at an opposite second end 238 to a fuel spray conduit 220 of the mixing passage 18. The first and second ends 236 and 238, respectively, may comprise openings in the fire deck 19 and fuel spray conduit 220, respectively. First end 236 may therefore also be referred to herein as first opening 236.

Thus, the fire deck 19 may include the openings 232 and 236 which permit combustion chamber gasses to flow from the combustion chamber and into the conduits 202 and 222, respectively, of the mixing passage 18. Specifically, the openings 232 and 236 may be formed in the fire deck 19, where the conduits 202 and 222 and the fire deck 19 are coupled. Thus, the cooled air conduit 202 be fluidly coupled to the combustion chamber 30 at the first end 236 and may thus provide fluidic communication between the combustion chamber 30 at the first squish region 246 and the fuel spray conduit 220. As such, gasses in the combustion chamber 30 at the first squish region 246 may flow into the cooled air conduit 202 via the first end 236. Gasses may flow through the cooled air conduit 202 and into the fuel spray conduit 220 via the second end 238. Thus, gasses may enter the cooled air conduit 202 from the first squish region 246 via the first end 236 of the conduit 202 which may be open to the combustion chamber 30. Gasses in the cooled air conduit 202 may then exit the cooled air conduit 202 via the second end 238 of the conduit 202 which may be open to one or more of the fuel spray conduit 220 and/or reservoir 226.

Further, a central air conduit 222 may be positioned vertically above and/or over the pip 237 of the piston 36. The volume of the combustion chamber 30 included between the pip 237 of the piston 36 and the central air conduit 222 may be a second squish region 248. The central air conduit 222 may be coupled to the combustion chamber 30 at a first end 232 and at an opposite second end 234 to a reservoir 226 of the mixing passage 18. The first end 232 and second end 234 may comprise openings in the fire deck 19 and reservoir 226, respectively. Thus, the first end 232 may also be referred to herein as first opening 232. Thus, the central air conduit 222 may provide fluidic communication between the combustion chamber 30 at the second squish region 248 and the reservoir 226. As such, gasses in the combustion chamber 30 at the second squish region 248 may flow into the central air conduit 222 via the first end 232 which may be open to the combustion chamber 30. Gasses may exit the central air conduit 222 through the second end 234 into one or more of the reservoir 226 and/or fuel spray conduit 220.

A first end 228 of the fuel spray conduit 220 may be positioned vertically above and/or over the bowl 239 of the piston 36. The first end 228 may form an opening in the fire deck 19. Thus, first end 228 may also be referred to herein as first opening 228. The volume of the combustion chamber 30 included between the bowl 239 of the piston 36 and the fire deck 19 and/or fuel spray conduit 220 may be a re-entrant region 243. The fuel spray conduit 220 may be coupled to the combustion chamber 30 at the first end 228 and at an opposite second end 230 to the reservoir 226 of the mixing passage 18. In particular, the second end 230 may be positioned directly in front of, and/or in line with, one or more injection orifices 272 of the injector 66. The first end 228 may comprise an opening in the fire deck 19, and the second end 230 may be open, thus allowing fuel injected from the one or more injection orifices 272 to pass through the fuel spray conduit 220 and into the combustion chamber 30.

The injector 66 may include a plurality of injection orifices 272, through which fuel may be injected. In one example, each of the injection orifices 272 may be aligned with a fuel spray conduit 220. Thus, in some examples, such as the example shown in FIG. 2A, the mixing passage 18 may include more than one fuel spray conduit 220. In some examples, the number of fuel spray conduits included in the mixing passage 18 may be the same as the number of injection orifices, such that exactly one of the injection orifices 272 may be aligned with each fuel spray conduit 220. However, in other examples, more or less than one injection orifice may be aligned with each fuel spray conduit 220. Further, in some examples, only one fuel spray conduit 220 may be included in the mixing passage 18.

The injector 66 may include a barrel 268 and a tip 270. The injection orifices may be included on the tip 270 of the injector 66. The barrel 268 may be substantially cylindrical, but may include one or more alignment features that orient the injector 66 such that each of the injection orifices 272 is aligned over a corresponding fuel spray conduit 220. However, in other examples, the barrel 268 may not be cylindrical and may be another shape such as one or more of rectangular, oval, triangular, pyramidal, etc. Further, the cross-sectional shape and/or size of the barrel 268 may vary along the central axis of the barrel 268. In particular, the injector 66 may be oriented such that the fuel spray direction from each of the orifices 272 is substantially parallel to a fuel spray conduit 220. Thus, at least one of the orifices 272 may be aligned with a central axis of each fuel spray conduit 220 such that the common direction of propagation of the fuel spray from each of the orifices 272 may be parallel to a length of a fuel spray conduit 220. More simply, each of the orifices 272 is in fluidic communication with a fuel spray conduit 220, such that fuel ejected from the orifices 272 may pass through the fuel spray conduit 220 en route to the combustion chamber 30.

The alignment feature may be bored into the engine head 16, where the injector 66 may rest. The alignment feature may have substantially the same cross-sectional shape of the injector 66.

The injector tip 270 including the injection orifices 272 may be positioned within the reservoir 226. The reservoir 226 may be formed at a top of the mixing passage 18, and may be shaped similar to a cone. Thus, the tip 270 of the injector may protrude through a top of the reservoir 226, and into the interior of the reservoir 227. However, in other examples, the tip 270 may not extend into the reservoir 227, such that the tip 270 and/or injection orifices 272 may be flush with the top of the reservoir 226. However, in yet further examples, as explained below in greater detail with reference to FIGS. 6-7, the tip 270 may be disposed within the combustion chamber 30, and may inject fuel directly into the combustion chamber 30, without passing through the fuel spray conduit 220.

In the example of FIG. 2A, each of the injection orifices 272 may be positioned a distance away from the second end 230 of a fuel spray conduit 220. Said another way, the reservoir 226 may separate each of the injection orifices 272 from each fuel spray conduit 220. However, in other examples, reservoir 226 may not be included in the mixing passage 18. In such examples, the second end 230 of each fuel spray conduit 220 may not be separated from the injection orifices 272, and may be positioned at the injection orifices 272, such that fuel may ejected from the orifices 272 passes directly into each fuel spray conduit 220.

One or more partitions 260 may be included between the conduits 202, 220, and 222 of the mixing passage 18. In particular, one of the partitions 260 may be included between the cooled air conduit 202, and the fuel spray conduit 220, and another one of the partitions 260 may be included between the fuel spray conduit 220 and the central air conduit 222. Thus, the conduits 202, 220, and 222 may be separated from one another by the partitions 260. As described above, the conduits 202, 220, and 222 may be hollow to provide fluidic communication between the combustion chamber 30 and the mixing passage 18. Further, the conduits 202, 220, and 222 may be defined by walls 240, 242, and 244, respectively. The partitions 260 may be defined as the volume included outside of the conduits 202, 220, and 222, between the exterior of the walls 240, 242, and 244 of the conduits 202, 220, and 222. In some examples, one or more of the partitions 260 may be hollow, such that ambient air may flow past the exterior of one or more of the conduits 202, 220 and 222. More specifically, in examples where the partitions 260 are hollow, ambient air may flow between the conduits 202, 220, and/or 222 of the mixing passage 18, thus flowing through the mixing passage 18.

In other examples, one or more of the partitions 260 may not be hollow and may be constructed from a thermally conductive material to transfer heat from one or more of the conduits 202, 220, and 222, to one or more engine components (e.g., cylinder head 16 described above in FIG. 1) and/or ambient air surrounding the exterior of the mixing passage 18. In yet further examples, one or more of the partitions 260 may comprise one or more engine components, such as various components of the cylinder head (e.g., intake valves 152 and exhaust valves 154 described above in FIG. 1).

In yet further examples, the one or more partitions 260 may include coolant passages, through which coolant flows. Thus, coolant may be directed through the one or more partitions 260 to increase cooling of the gasses in the mixing passage 18. As such, coolant in the one or more partitions 260 may absorb heat from gasses in the mixing passage 18, increasing heat dissipation from the gasses in the mixing passage 18 to the one or more partitions 260.

In yet further examples, one or more of the partitions 260 may comprise a portion of the cylinder head (e.g., cylinder head 16 described above with reference to FIG. 1), and may be integrally formed within the cylinder head. Thus, one more of the partitions 260 may integrally form a portion of the cylinder head, where the one or more partitions 260 may form a single continuous piece with the cylinder head and may not comprise a separate component. Further, the one or more partitions 260 may not comprise a portion of the mixing passage 18, and may be separate from the mixing passage 18.

In still further examples, one or more of the partitions 260 may comprise a portion of the mixing passage 18. As such, one or more of the partitions 260 may be integrally formed within the mixing passage 18 and may form a single, continuous piece with the mixing passage 18.

A housing or exterior surface 231 of the mixing passage 18 may define the exterior of the mixing passage 18. Thus, components of the mixing passage 18, may be included within the housing 231. In some examples, such as the example shown in FIG. 2A, an exterior of the wall 240 of the cooled air conduit 202 may define all or a portion of the housing 231 of the mixing passage 18. In some examples, the cylinder head may be positioned exterior to a portion or all of the housing 231 of the mixing passage 18. However in other examples, such as in the example of FIG. 2A, ambient air may surround the mixing passage 18. Thus, in some examples, ambient air may be positioned exterior to the cooled air conduit 202. In particular, an exterior-facing surface 251 of the wall 240 of the cooled air conduit 202 may interface with ambient air. Thus, ambient air may contact the exterior-facing surface 251 of the wall 240 of the cooled air conduit 202. As such, in the example of FIG. 2A, ambient air may contact the exterior-facing surface 251, to the left of the conduit 202 with respect to axis 294, and above the conduit 202 with respect to axis 292. In this way, heat from the air within the cooled air conduit 202 may be transferred to the ambient air flowing exterior to the conduit 202. Thus, the air in the cooled air conduit 202 may be cooled en route to mixing with the fuel in the fuel spray conduit 220.

However, it should be appreciated that in other examples, the cylinder head may be positioned exterior to a portion or all of the exterior-facing surface 251 of the wall 240. Thus, in some examples, the cylinder head may physically contact the exterior-facing surface 251 of the cooled air conduit 202, and may absorb heat from the cooled air conduit 202. In this way, heat from the air in the cooled air conduit 202 may be transferred to the cylinder head as the air flows through the cooled air conduit 202. Thus, air in the combustion chamber 30 may be cooled en route to mixing with the fuel in fuel spray conduit 220, via heat dissipation to the cylinder head.

Thus, combustion chamber gasses may flow through one or more of the cooled air conduit 202 and/or central air conduit 222 into one or more of the reservoir 226 and/or fuel spray conduit 220 as depicted in greater detail below with reference to FIGS. 2B-2C. Cutting plane 280 defines a cross-section of the mixing passage 18 shown below in FIG. 5.

Figure 2B:
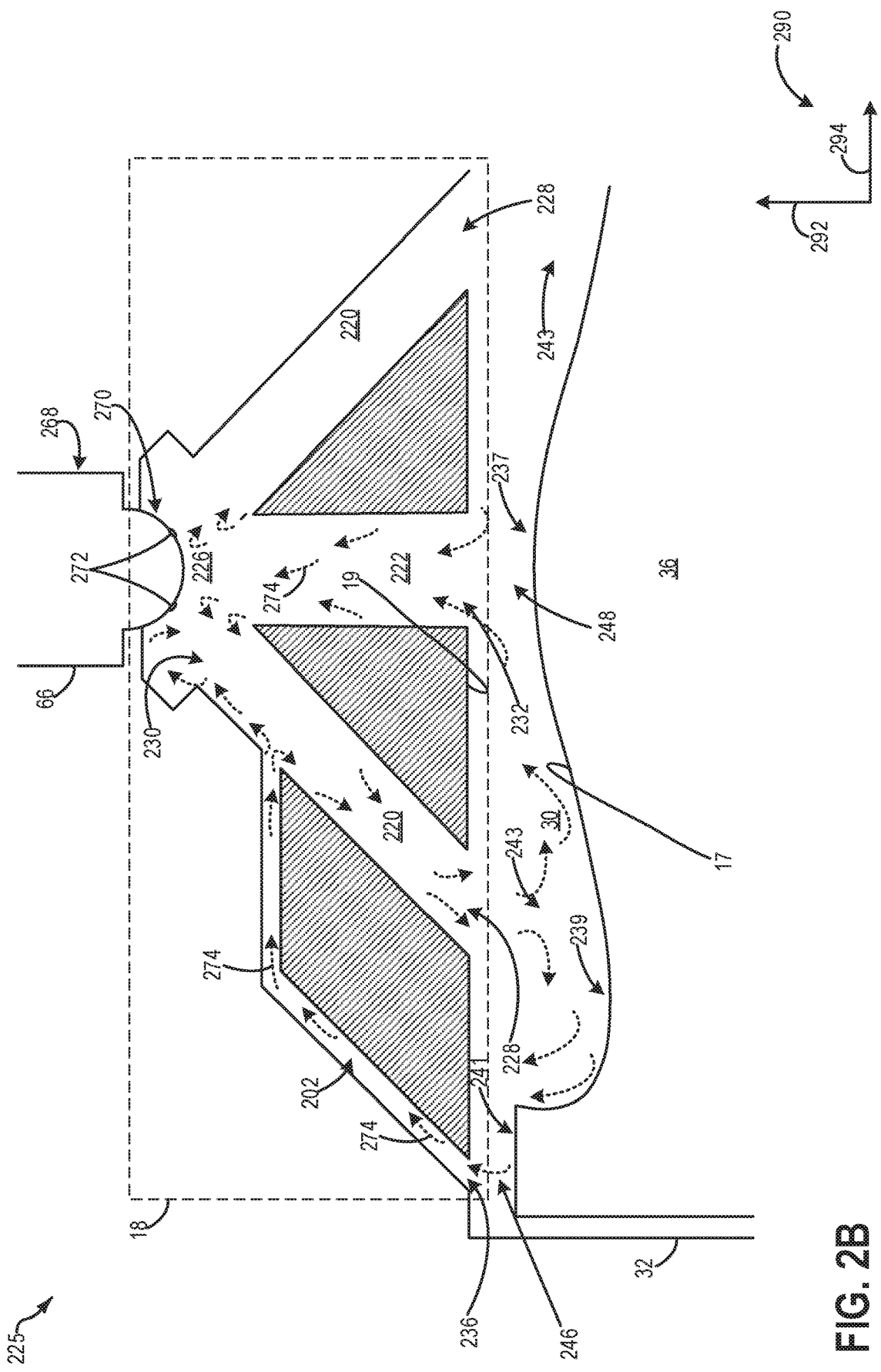
FIG. 2B shows a side, cross-sectional view of the fuel-air mixing chamber of FIG. 1, in accordance with an embodiment of the present disclosure.

Turning now to FIG. 2B, it shows a second side cross-sectional view 225 of the mixing passage 18, where an example airflow pattern through the mixing passage 18 is depicted. The flow of air in FIG. 2B is depicted by flow arrows 274. Thus, FIG. 2B depicts the same and/or similar view of the mixing passage 18 and combustion chamber 30 as FIG. 2A, except that FIG. 2B also depicts an example flow of air from the combustion chamber 30 to the mixing passage 18. Thus, flow arrows 274, depict an example flow of air from the combustion chamber 30 through the mixing passage 18, where the air depicted by the flow arrows 274 may be intake air that was admitted into the combustion chamber 30 via opening of one or more intake valves (e.g., intake valves 152 described above in FIG. 1).

FIG. 2B, shows an example where the piston 36 is at or near TDC. As the piston 36 moves vertically upwards to TDC relative to vertical axis 292, towards the mixing passage 18 and fire deck 19, a higher pressure may be created in the first and second squish regions 246 and 248, respectively, relative to the re-entrant region 243. In particular, as the piston 36 moves upward, the volume included between the fire deck 19 and the lip 241, and between the fire deck 19 and the pip 237 may be smaller than the volume included between the fire deck 19 and the bowl 239, since the bowl 239 is recessed relative to the lip 241 and pip 237. Due to the openings formed in the fire deck 19 by the first end 236 of the cooled air conduit 202 and/or first end 232 of the central air conduit 222, air in the combustion chamber may be pushed into one or more of the cooled air conduit 202 and/or central air conduit 222 as the piston 36 moves upwards towards TDC. Further, a swirl pattern may be created in the bowl 239 and re-entrant region 243, where air may flow towards the top surface 17 of the piston 36 at a center of the bowl 239, and then may flow away from the bowl 239 towards either the pip 237 or lip 241, as depicted in FIG. 2B. In other examples, the first end 236 of the cooled air conduit 202 may be positioned more central to the axis X-X' than the lip 241. Thus, the first end 236 may be positioned at a smaller distance from the axis X-X' than the lip 241.

As the air from the combustion chamber 30 enters the cooled air conduit 202 and/or central air conduit 222, the air may dissipate heat to the surrounding cylinder head and/or ambient air. Further, the air in the conduits 202 and/or 222 may dissipate heat to the partitions 260, which as explained above with reference to FIG. 2A, may comprise a portion of the mixing passage 18 and/or cylinder head. Thus, the temperature of the air in the conduits 202 and/or 222 may be reduced relative to air in the combustion chamber 30. Said another way, the cylinder head and/or ambient air may remove heat from the air in the conduits 202 and/or 222, thus reducing the temperature of the air in the conduits 202 and/or 222 below the temperature of the air in the combustion chamber 30.

Air in the conduits 202 and/or 222 may enter the reservoir 226 after passing through the conduits 202 and/or 222. The cooled air may remain and/or hold in the reservoir 226 for a duration. While holding in the reservoir 226, the temperature of the air may continue to decrease, as the air may continue to lose heat to the cylinder head and/or ambient air. In this way, the reservoir 226 may hold a volume of cooled air that is at a lower temperature than air in the combustion chamber 30.

Moving on to FIG. 3C, it shows a third side cross-sectional view 250 of the mixing passage 18, where an example fuel spray 252 is depicted. The fuel spray 252 in FIG. 2B is depicted by first dashed lines, and a combustion flame 254 is depicted by second dashed lines. Thus, FIG. 2C depicts the same and/or similar view of the mixing passage 18 and combustion chamber 30 as FIGS. 2A and 2B, except that FIG. 2C also depicts an example fuel spray pattern as fuel is injected from the injector 66.

During fuel injection, fuel may be injected from one or more of the injection orifices 272. In the example of FIG. 2C, fuel spray from one of the injection orifices 272 along one fuel spray conduit 220 is depicted. However, it should be appreciated that in other examples, fuel may be ejected out of more than one of the orifices 272 and/or down more than one fuel spray conduit 220.

Figure 2C:
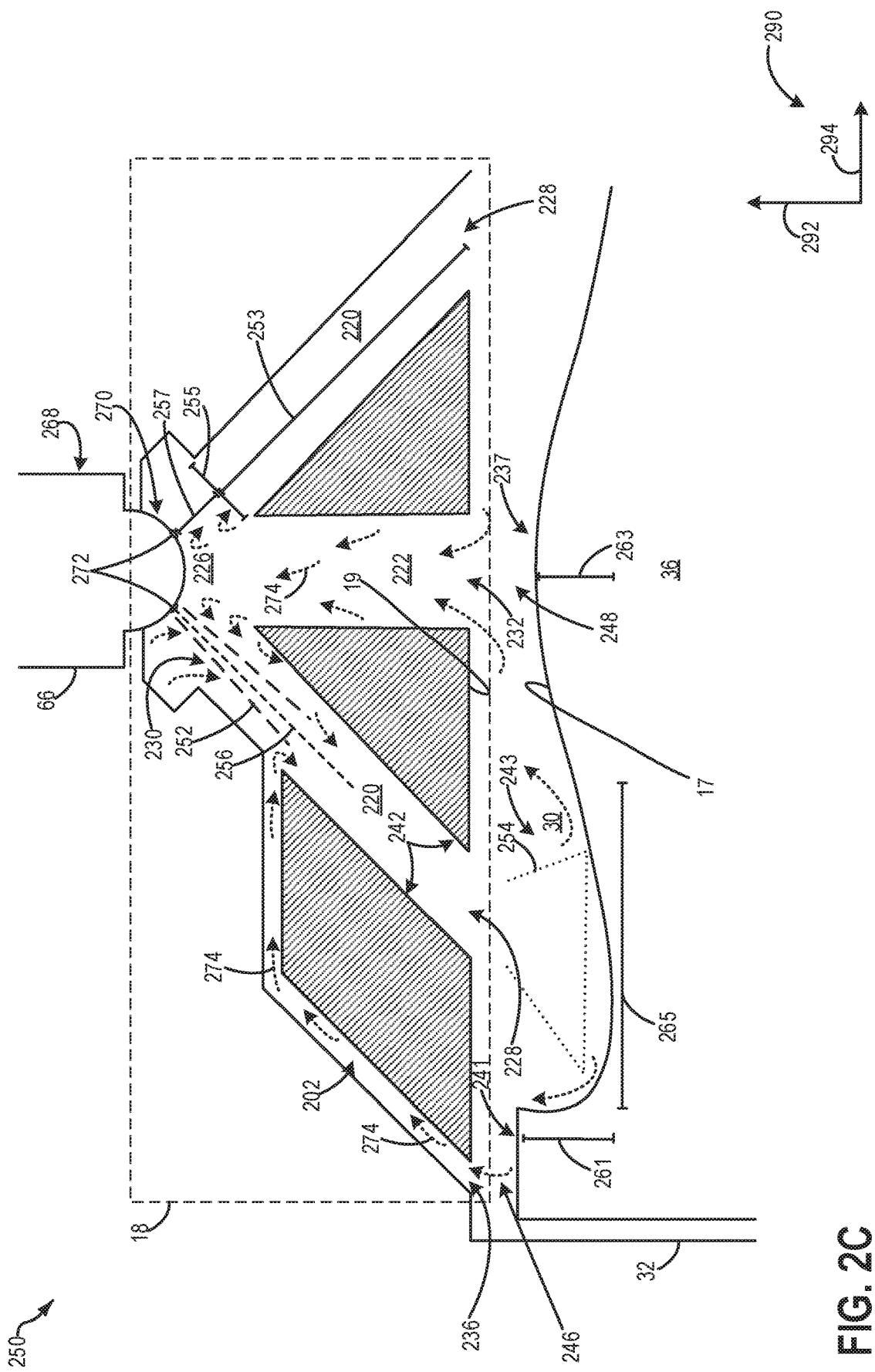
FIG. 2C shows a side, cross-sectional view of the fuel-air mixing chamber of FIG. 1, in accordance with an embodiment of the present disclosure.

In some examples, such as the example shown in FIG. 2C, fuel may enter the reservoir 226 as it is ejected from the orifices 272. Specifically, the fuel may travel a distance in the reservoir 226 before entering a fuel spray conduit 220. In particular, the reservoir 226 may be sized such that the second end 230 of the fuel spray conduit 220 is separated by a first distance 257 from the orifices 272. In some examples, the distance 257 between at least one of the orifices 272 and the fuel spray conduit 220 may be a distance in a range of distances between 0.5 mm and 10 mm.

However, in other examples, the reservoir 226 may not be included, and fuel may be ejected from the orifices 272 directly into one or more fuel spray conduits. Thus, in some examples, the orifices 272 may be positioned adjacent or within the fuel spray conduits.

The cooled air in the reservoir 226 may mix with the fuel injected from the orifices 272. Thus, the fuel may entrain a portion or all of the air included in the reservoir 226 as it travels towards the fuel spray conduit 220. Further, the injected fuel may continue to mix with, and entrain air in the fuel spray conduit 220 and/or air from one or more of the cooled air conduit 202 and/or central air conduit 222. Thus, air in the central air conduit 222 and/or cooled air conduit 202 may mix with fuel ejected from the fuel injector 66 as the fuel propagates towards and/or through the conduit 220 from the orifices 272.

The diameter of the fuel spray 252 may increase as the fuel travels towards the conduit 220 from the injection orifices 272, as depicted by the dashed lines in FIG. 2C. The fuel spray spreading diameter may therefore be represented by the distance between the two dashed lines of the fuel spray 252 shown in FIG. 2C. Thus, the diameter of the fuel spray may be smaller at the orifices 272 than at the second end 230 of the fuel spray conduit 220. However, a diameter 255 of the fuel spray conduit 220 may be sized such that it is greater than the diameter of the fuel spray 252 at the second end 230 of the fuel spray conduit 220. Thus, the fuel spray may not contact the walls 242 of the fuel spray conduit 220 at the second end 230 of the fuel spray conduit 220. In some examples, the diameter 255 of the fuel spray conduit 220 may be sized to any diameter in a range of diameters between 1 mm and 10 mm. The spreading diameter of the fuel spray 252 may be determined based on one or more of the density of the air in the reservoir 226, fuel density, and the distance 257 between the orifices 272 and the fuel spray conduit 220.

Thus, the cooled combustion chamber gasses in one or more of the reservoir 226, cooled air conduit 202, central air conduit 222, and/or fuel spray conduit 220 may mix with the fuel injected from the injection orifices 272. In particular, as the fuel travels towards the combustion chamber 30 within the fuel spray conduit 220, the injected fuel may mix with the surrounding gasses in the fuel spray conduit 220 which may include air (e.g., $N_2$, $O_2$, $CO_2$, $H_2O$, Ar, etc.), and/or other gasses.

However, the fuel and/or air in the fuel spray conduit 220 may contact the walls 242 of the fuel spray conduit 220, as the fuel and/or air mixture travels towards the combustion chamber 30. Due to viscous forces exerted on the fuel and/or air mixture by the walls 242 of the fuel spray conduit 220, a boundary layer may be formed in the flow of the fuel and/or air mixture in the fuel spray conduit 220. In particular, a turbulent boundary layer may be formed in the flow of the fuel and/or air mixture in the fuel spray conduit 220. Thus, the fuel spray conduit 220 may be sized to establish a turbulent boundary layer in the fuel and/or air mixture by leveraging the no-slip condition between the walls 242 of the conduit 220 and the fuel spray 252. By increasing the size of the turbulent boundary layer in the fuel spray, mixing along a fuel spray axis 256 may be increased, which may in turn reduce the equivalence ratio at the lift-off length. The fuel spray axis 256 may define a central axis of the fuel spray 252 that may extend along a common direction of propagation of the fuel spray 252. For example, the fuel spray axis 256 may extend from a center of one of the orifices 272, down a center of the fuel spray conduit 220, where the axis 256 may be parallel to the walls 242 of the fuel spray conduit 220.

The length 253 of the conduit 220 may be defined as the distance between the first end 228 and second end 230 of the fuel spray conduit 220, or distance between the combustion chamber 30 and reservoir 226 which are fluidly coupled to one another by the fuel spray conduit 220. In some examples, the length 253 of the fuel spray conduit 220 may depend on the size of the engine and/or the size (e.g., diameter) of the combustion chamber 30. In some examples, the length 253 of the fuel spray conduit may be sized to any length in a range of lengths between 1 mm and 25 mm. The fuel spray conduit 200 may be less than ½ of the diameter of the combustion chamber 30. Further, the length 253 of the conduit 220 may be greater than a turbulent mixing length, where the turbulent mixing length may be the distance from the point of fuel injection at the orifices 272, to a position in the mixing passage 18 where the fuel and/or air mixture completely transitions to turbulent flow. The turbulent mixing length may be a function of Reynolds number, the friction factor within the conduit 220, and the relative roughness of the walls 242 of the conduit 220. Additionally or alternatively, the length 253 of the conduit 220 may be shorter than an expected lift-off length for a free fuel jet under the same and/or similar ambient in-cylinder conditions as the conduit 220 such that ignition does not occur inside of the conduit 220. Thus, the length 253 of the conduit 220 may be sized such that combustion does not occur in the conduit 220. In yet further examples, the length 253 of the conduit 220 may be less than a stagnation length, where the stagnation length may be the distance between the second end 230 of the conduit 220 and the point along the conduit 220 where the flow stagnates and becomes sonic. The stagnation length may be determined based on one or more of the diameter 255 of the conduit 220, friction factor for the conduit 220, entrance velocity of the fuel and ambient gas mixture in the conduit 220, and the thermodynamic conditions in the conduit 220.

After mixing with air in the fuel spray conduit 220, the air-entrained fuel mixture may exit the conduit 220 via the first end 228, enter the combustion chamber 30, and subsequently combust. Thus, the length of the fuel spray conduit 220 may be sized, such that fuel does not combust in the fuel spray conduit 220. As such, combustion may not occur in the fuel spray conduit 220, and may only occur in the combustion chamber 30. However, in other examples, combustion may occur in the fuel spray conduit 220. In the description herein, combustion is defined as the burning of the fuel such that a threshold amount of heat is released. Additionally or alternatively, combustion may be defined where the ambient in-cylinder light emissions between 250 nm and 1000 nm increase above a threshold. In some examples, the threshold may be an increase in light emissions of wavelengths between 250 nm and 1000 nm of half an order of magnitude.

Further, the velocity at which the fuel is injected by the injector 66 may be adjusted such that a velocity of the fuel and ambient gas mixture that is not a part of the thermal boundary layer of the walls 242 of the conduit 220 and is exiting the conduit 220 may exceed turbulent flame speed of fuel and ambient gas mixture within the conduit 220. The turbulent flame speed may be determined based on one or more of head and minor losses along the conduit 220, flow rate at the injector orifices 272, mixture fraction, and the thermodynamic conditions inside of the conduit 220. Additionally or alternatively, a residence time, or amount of time it takes fuel to travel from the injector orifices 272 to the first end 228 of the fuel spray conduit 220 may not exceed ignition delay for the fuel at the thermodynamic conditions and mixture distribution within the conduit 220. In this way, the fuel may not combust in the conduit 220.

The size, shape, and geometry of the fuel spray conduit 220 may be adjusted based on the geometry of the injector 66, predicted in-cylinder thermodynamic conditions, fuel spray velocity, fuel density, etc. The conduit 220 may in some examples comprise a uniform cross-sectional area. However, in other examples, the conduit 220 may include one or more of converging and/or diverging cross-sectional areas, dimples along the walls 242, bluff body features (i.e. step or trench), and small holes that provide fluidic communication between the combustion chamber 30 and the fuel spray conduit 220. Further, on some examples, the conduit 220 may be substantially straight and/or cylindrical or tubular as depicted in the example of FIGS. 2A-2C. However, in other examples, the conduit 220 may be curved. In yet further examples, the conduit 220 may not be cylindrical. For example, the conduit 220 may be one or more of rectangular, elliptical, triangular, pyramidal, etc. Further, the cross-section of the conduit 220 may be uniform along its length. However, in other examples, the shape and/or size of the cross-section of the conduit 220 may vary along the length of the conduit 220.

It is important to note that one or more of the conduits 202, 220 and/or 222 of the mixing passage 18 may not be fully enclosed and may comprise one or more of a cone shape, half cylindrical groove, or a depression, recessed into the fire deck 19. Further, it should be appreciated that one or more secondary conduits may be included in the mixing passage 18 which fluidly couple the combustion chamber 30 to a portion of the fuel spray conduit 220. Thus, one or more openings in the walls 242 of the fuel spray conduit 220 may be included which may be fluidly coupled to the combustion chamber 30, for directing air from the combustion chamber 30 to the fuel spray conduit 220.

It is also important to note that the one or more of the conduits 202, 220, and 222 may be cylindrical, in some examples. However, in other examples, one or more of the conduits 202, 220, and 222 may be one or more of rectangular, elliptical, triangular, pyramidal, etc. Further, the cross-sections of the one or more of the conduits 202, 220, and 222 may be uniform along their lengths. However, in other examples, the shape and/or size of the cross-sections of the one or more of the conduits 202, 220, and 222 may vary along the lengths of the one or more of the conduits 202, 220, and 222.

In some examples, the size and/or shape of one or more of the conduits 202, 220, and 222 and/or reservoir 226 may be determined experimentally or modeled using computational fluid dynamic resources.

As shown in FIG. 2C, the bowl 239 may be shaped to shallower and/or wider than bowls included in engine systems not including the mixing passage 18. The size and/or shape of the bowl 239 may be adjusted to compensate for the size of the conduits 202, 220, and 222 in the mixing passage 18 while maintaining a desired compression ratio. In addition to maintaining a desired compression ratio, the shallower bowl may reduce the surface area to volume ratio inside the combustion chamber 30 and may reduce heat transfer which may increase the thermal efficiency of the engine. In addition to the shallower bowl, the curvatures of the outside edges of the bowl 239 may be made steeper to redirect the combustion gasses that are exiting the fuel spray conduit 220 towards the center of the combustion chamber 30. In addition, the curvature of the bowl 239 near the pip 237 may be made steeper to redirect the combustion gasses away from the center of the combustion chamber 30 and the central air conduit 222. The steeper edges of the bowl 239 proximate the lip 241 and pip 237 may therefore reduce and/or prevent the flow of hot combustion gasses to one or more of the conduits 202 and 222. As such, the hot combustion gasses may be maintained within the re-entrant region 243 away from the squish regions 246 and 248.

Thus, while the piston 36 travels towards TDC, the piston may push intake air up through the conduits 202 and/or 222. However, when the piston 36 is near TDC, the pip 237 and/or lip 241 may block the first ends 236 and 232 of the conduits 202 and 222, respectively, such that gasses in the re-entrant region 243 may not enter the squish regions 246 and 248. In this way, the piston 36 may restrict gasses in the re-entrant region 243 and gasses exiting the fuel spray conduit 220 to the re-entrant region 243.

In particular a depth 261 of the bowl 239, which may be defined as the distance between the lip 241 and the most recessed point of the bowl 239, may be sized such that the depth 261 is sufficient to prevent fuel spray from the injector 66 from impinging on the surface of the bowl 239. Further, a width 265 of the bowl 239, which may be defined as the distance between the lip 241 and the pip 237, may be sized to be such that it is less than a radius of the combustion chamber 30 and greater than a diameter of the injector tip 270. Further, a height 263 of the pip 237, which may be defined as the distance between the top of the pip 237 and the most recessed point of the bowl 239, may be sized such that the pip 237 is separated from the injector tip 270 and/or fire deck 19 by a distance of 0.001 mm at TDC. However, in other examples, the height of the pip 237 may be less and may be sized such that the pip 237 is separated from the injector tip 270 and/or fire deck 19 by a distance greater than 0.001 mm at TDC. In yet further examples, the pip 237 may not be raised relative to the bowl 239.

Figure 2D:
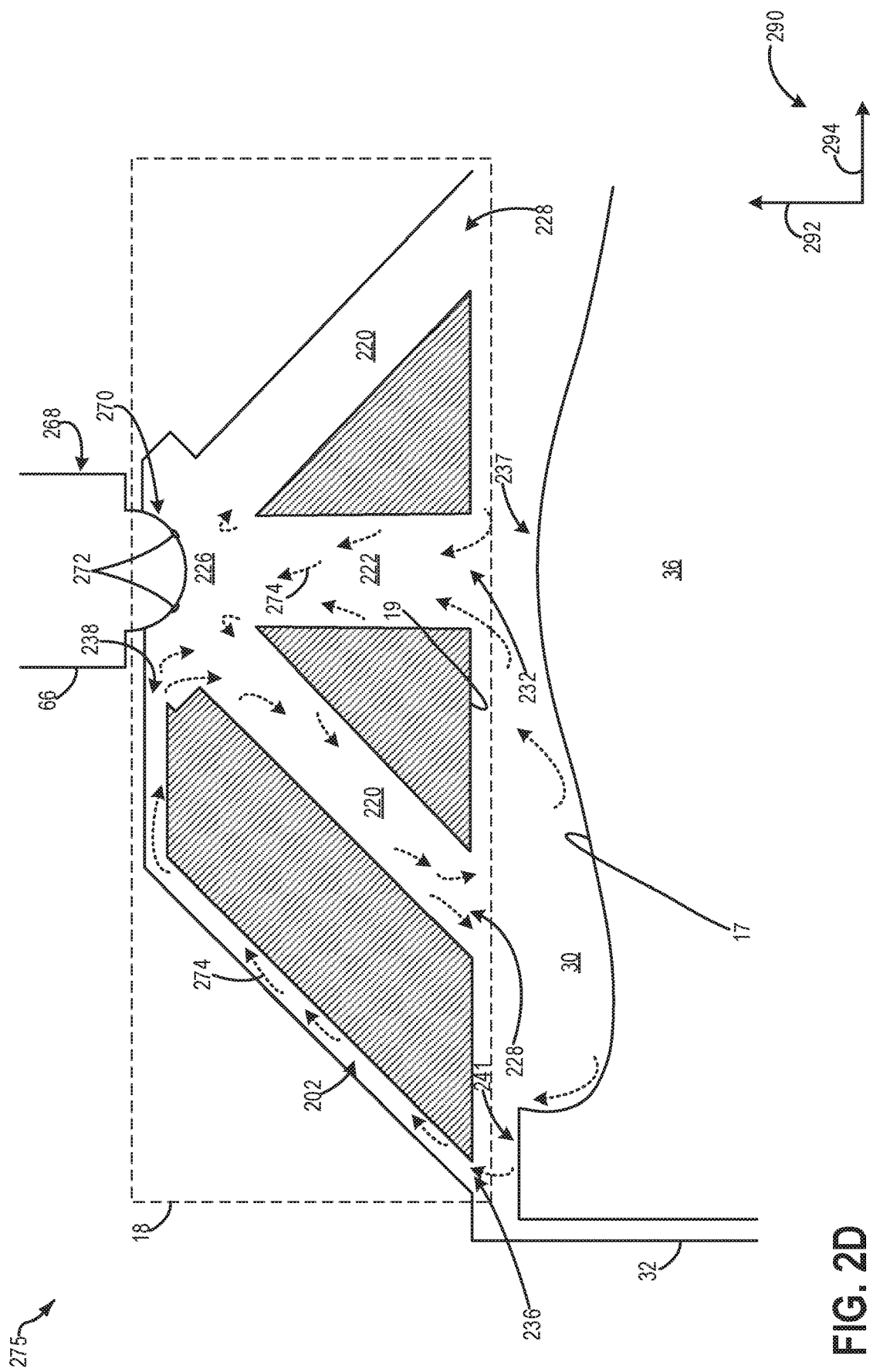
FIG. 2D shows a side, cross-sectional view of the fuel-air mixing chamber of FIG. 1, in accordance with an embodiment of the present disclosure.

Turning now to FIG. 2D, it shows a fourth side cross-sectional view 275 of the mixing passage 18, where the cooled air conduit 202 is shown coupled directly to the reservoir 226. Thus, FIG. 2D depicts the same and/or similar view of the mixing passage 18 and combustion chamber 30 as FIGS. 2A-2C, except that FIG. 2D shows an embodiment where the conduit 202 may be coupled at the second end 238 to the reservoir 226 instead of the fuel spray conduit 220.

Thus, gasses from the combustion chamber 30 may enter the conduit 202 via the first end 236, and may travel through the conduit 202. The gasses may be cooled as they travel through the conduit 202, and the gasses may exit the conduit 202 via the second end 238 into the reservoir 226. Thus, the second end 238 of the conduit 202 may be coupled to the reservoir 226.

Figure 3A:
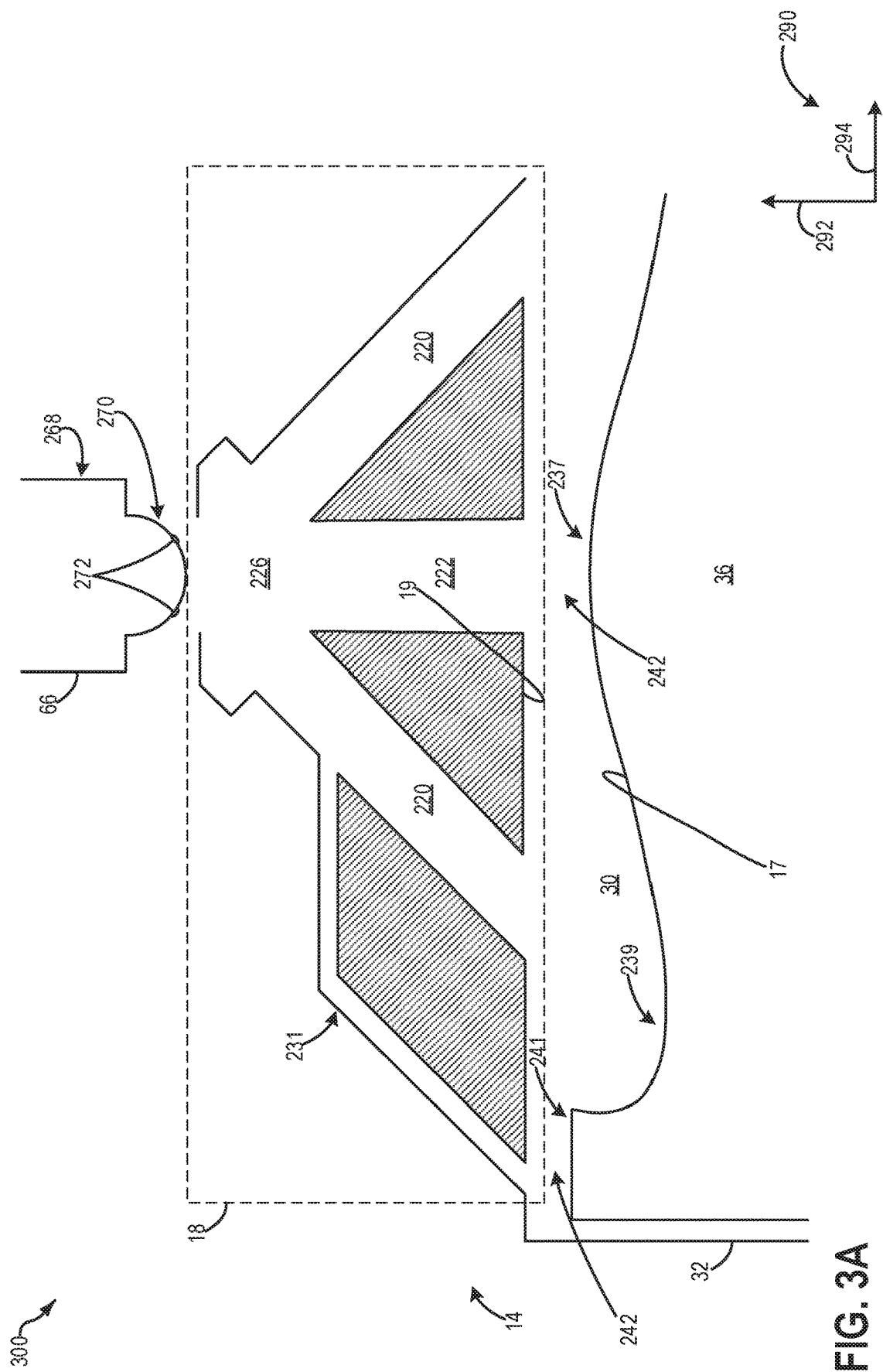
FIG. 3A shows an exploded, side, cross-sectional view of the fuel-air mixing chamber of FIG. 1, in accordance with an embodiment of the present disclosure.
Figure 3B:
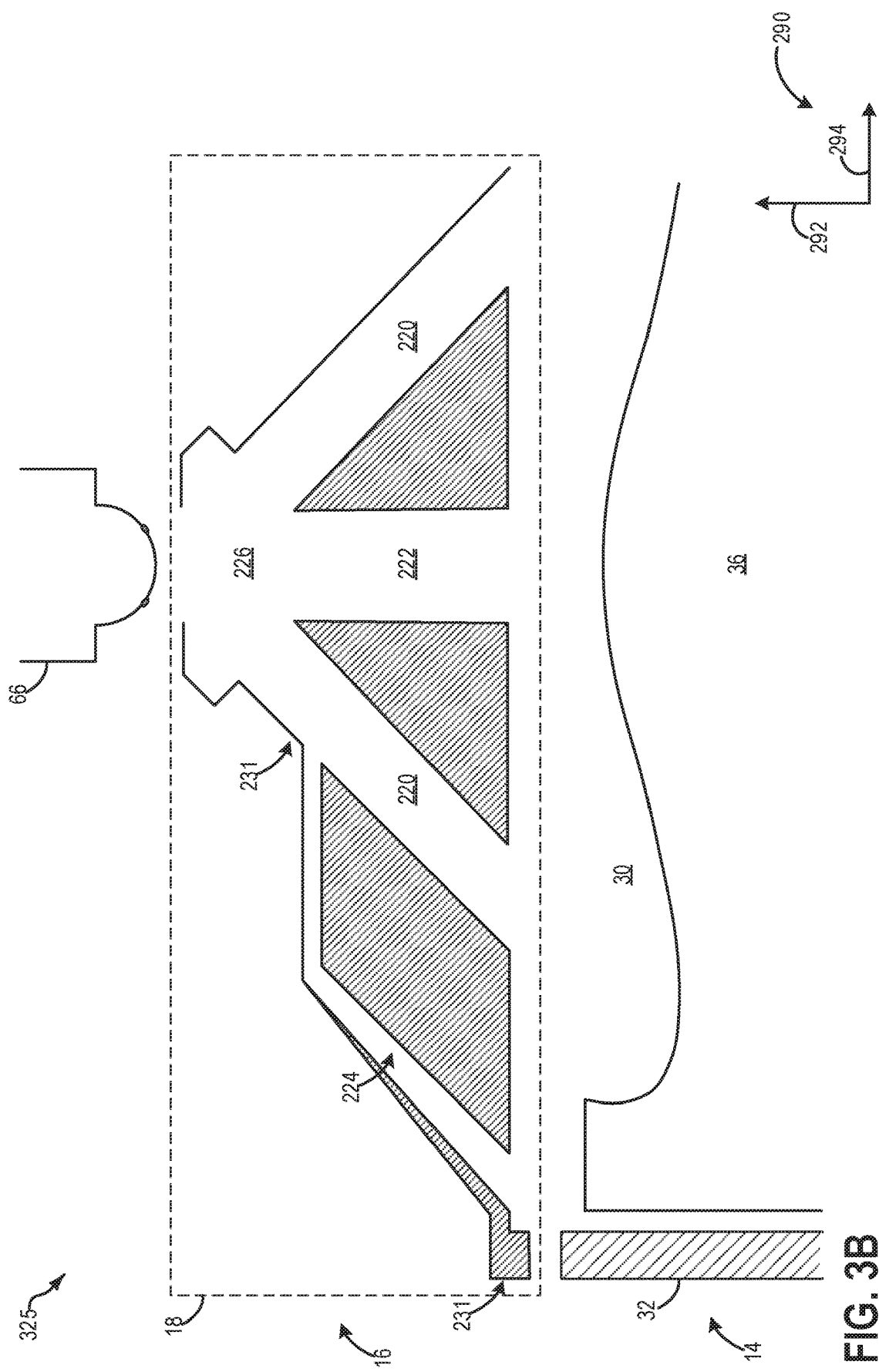
FIG. 3B shows an exploded, side, cross-sectional view of the fuel-air mixing chamber of FIG. 1, in accordance with an embodiment of the present disclosure.

Turning now to FIGS. 3A-3C, they examples of how the mixing passage 18 may be formed within one or more of the cylinder block 14, cylinder head 16 and/or injector 66. In particular, the FIGS. 3A-3C show cross-sectional exploded views of the mixing passage 18, injector 66, cylinder block 14, and cylinder head 16.

Focusing on FIG. 3A, it shows a fifth side cross-sectional view 300 of the mixing passage 18, where the mixing passage 18 is integrally formed within a top of the cylinder block 14. Thus, in the example of FIG. 3A, the mixing passage 18 may form a single, continuous piece with the cylinder block 14. In particular the housing 231 of the mixing passage 18 may be continuous with the cylinder walls 32. As such, the conduits 202, 220, and 222 of the mixing passage 18, may be formed within the cylinder block 14, at a top of the cylinder block 14, above the combustion chamber 30, with respect to the vertical axis 292. As such, the mixing passage 18, and cylinder block 14 may not be discrete, separate components that are coupled to one another, but instead may be formed together as one piece. The fuel injector 66 may be formed as a discrete separate piece, which may then be coupled to the cylinder block 14.

Focusing on FIG. 3B, it shows a sixth side cross-sectional view 325 of the mixing passage 18, where the mixing passage 18 is integrally formed within the cylinder head 16. Thus, in the example of FIG. 3B, the mixing passage 18 may form a single, continuous piece with the cylinder head 16. As such, the conduits 202, 220, and 222 of the mixing passage 18, may be formed within the cylinder head 16, at a bottom of the cylinder block 14, above the combustion chamber 30, with respect to the vertical axis 292. As such, the mixing passage 18, and cylinder head 16 may not be discrete, separate components that are coupled to one another, but instead may be formed together as one piece. Said another way, the conduit 202, 220, and 222 may be hollow passages included in the cylinder head 16. In this way, Thus as shown in the example of FIG. 3B, the cylinder block 14, the cylinder head 16 including the mixing passage 18, and the injector 66 may be separate and distinct components that are coupled together. The cylinder head 16 may be bolted to the cylinder block 14 in some examples. The fuel injector 66 may be formed as a discrete separate piece, which may then be coupled to the cylinder block 14.

Focusing on FIG. 3C, it shows a seventh side cross-sectional view 350 of the mixing passage 18, where the mixing passage 18 is integrally formed with the injector 66. Thus, in the example of FIG. 3B, the mixing passage 18 may form a single, continuous piece with the injector 66. Specifically, the housing 231 of the mixing passage 18 may form a single continuous piece with a housing 302 of the injector 66. Thus, the injector housing 302 may be shaped to include one or more of the conduits 202, 220, and 222 of the mixing passage 18. Thus as shown in the example of FIG. 3C, the injector 66 may include the mixing passage 18, and may be coupled to the cylinder head 16 (not shown in FIG. 3C).

It should be appreciated that in other examples, the mixing passage 18 may not comprise a single piece, but may include multiple separate pieces that may be integrally formed within one or more of the cylinder block 14, cylinder head 16, and/or injector 66. For example the cooled air conduit 202 may be partially formed within the cylinder block 14, while the reservoir 226 may be included within the cylinder head 16. Thus, the mixing passage 18 may be formed when the cylinder block 14 and cylinder head 16 are bolted together, and the injector 66 is coupled to the cylinder head 16. In yet further, examples, the mixing passage 18 may be a separate component that may not be integrally formed in the cylinder head 16, cylinder block 14, and/or injector 66. Thus, in some examples, the mixing passage 18 may be separately formed and then subsequently coupled to one or more of the cylinder head 16, cylinder block 14, and/or injector 66.

Turning now to FIG. 4, it shows a cross-sectional view 400 of the fuel spray conduit 220 with example surface features that may be included along the walls 242 of the fuel spray conduit 220. Thus, the coefficient of friction of the walls 242, and/or the roughness of the walls 242 may be adjusted by the inclusion of the various surface features depicted in FIG. 4. Further, the inclusion of the surface features may increase turbulence and/or mixing of air and fuel within the fuel spray conduit 220.

For example, one or more first surface features 402 may be included along the interior of the walls 242 of the fuel spray conduit 220. The first surface features 402 may extend inward towards a center of the fuel spray conduit 220. The surface features 402 may therefore disturb laminar flow within the fuel spray conduit 220 and may increase turbulence in the flow of the air and/or fuel mixture in the fuel spray conduit 220.

As another example, one or more second surface features 404 may be included along the interior of the walls 242 of the fuel spray conduit 220. The second surfaces features 404 may include one or more grooves 405 that may increase the roughness of the walls 242 of the conduit 220. In this way, viscous drag forces exerted by the walls 242 on the air and/or fuel mixture in the conduit 220 may be increased by the inclusion of the groves 405, and thus the turbulent boundary layer thickness may be increased, enhancing mixing of the fuel and air prior to delivery to the combustion chamber 30.

As depicted in the example of FIG. 4, air may enter the fuel spray conduit 220 from the second end 238 of the cooled air conduit 202 (not shown in FIG. 4). Further, the fuel spray conduit 220 may include one or more perforations 440 proximate the first end 228 of fuel spray conduit 220 along the walls 242 of the fuel spray conduit 220. The perforations 440 may be in fluidic communication with the combustion chamber 30, such that gasses from the combustion chamber 30 may enter the fuel spray conduit 220 via the perforations 440. The perforations 440 may therefore extend between the fuel spray conduit 220 and the combustion chamber 30, and may be formed as grooves, or recessed in the fire deck 19 (not shown in FIG. 4) of the combustion chamber 30.

Moving on to FIG. 5, it shows a top, cross-sectional view 500 of a top of the combustion chamber 30 including conduits of the mixing passage 18. In particular, the view 500 in FIG. 5, shows a cross-section of the top of the combustion chamber 30 along cutting plane 280 (not shown in FIG. 5) described above with reference to FIG. 2A. Thus, the view 500 in FIG. 5, shows a cross-section taken along the fire deck 19 (not shown in FIG. 5), where the conduits 202, 220, and 222 are coupled to the combustion chamber 30. Thus, FIG. 5, shows the openings formed in the fire deck 19 of the combustion chamber 30 by the conduits 202, 220, and 222. Further cutting plane 580, shown in FIG. 5 may define the cross section of the mixing passage 18 and combustion chamber 30 shown above in FIGS. 2A-3C. Cutting plane 580 may pass through a center of the combustion chamber 30. Thus, the view 500 in FIG. 5 may be a cross-sectional view looking down towards the top surface 17 the piston 36 (not shown in FIG. 5).

As shown in the example of FIG. 5, each cooled air conduit 202 may be positioned proximate a circumference of the combustion chamber 30, proximate the cylinder walls 32. In some examples, a plurality of cooled air conduits may be included for each combustion chamber 30 as depicted in FIG. 5. The cooled air conduits may in some examples be evenly spaced around the perimeter of the combustion chamber 30 and/or may be positioned the same or similar distance from the central axis of the combustion chamber 30. As such, in some examples, two cooled air conduits may be aligned with each other relative to the center of the combustion chamber 30, such that a straight line drawn between the two cooled air conduits may pass through the center of the combustion chamber 30 and may define the diameter of the combustion chamber 30. However, in other examples, the cooled air conduits may not be evenly spaced, and/or may be distributed according to a mathematical distribution. In the example of FIG. 5, 8 cooled air conduits may be included per combustion chamber 30. However, in other examples more or less than 8 cooled air conduits may be included per combustion chamber 30.

The intake valves 152 and exhaust valves 154 may be included interior to the cooled air conduits, closer to the central axis of the combustion chamber 30. Each fuel spray conduit 220 may be positioned interior to the valves 152 and 154, between the valves 152 and 154, and the central air conduit 222. Thus, the combustion chamber 30 may include a plurality of fuel spray conduits. In the example of FIG. 5, 8 fuel spray conduits may be included per combustion chamber 30. However, in other examples, more or less than 8 fuel spray conduits may be included per combustion chamber 30. The fuel spray conduits may in some examples be evenly spaced around the combustion chamber 30 and/or may be positioned the same distance from the central axis of the combustion chamber 30. As such, in some examples, two fuel spray conduits may be aligned with each other relative to the center of the combustion chamber 30, such that a straight line drawn between the two fuel spray conduits may pass through the center of the combustion chamber 30 and may define the diameter of the combustion chamber 30. However, in other examples, the fuel spray conduits may not be evenly spaced, and/or may be distributed according to a mathematical distribution.

In the example of FIG. 5, the central air conduit 222 may be centered on the central axis of the combustion chamber 30. However, in other examples, the central air conduit 22 may not be centered on the central axis of the combustion chamber 30. Further, in some examples, exactly one central air conduit 222 may be included per combustion chamber 30. However, in other examples, more than one central air conduit 222 may be include per combustion chamber 30. The relative sizing, shape, positioning, and spacing of the conduits 220, 222, and 202 may be adjusted from what is shown in the example configuration of FIG. 5.

Turning now to FIGS. 6 and 7, they shows example embodiments of the cooled air conduit 202, where the cooled air conduit 202 is positioned adjacent to the injector 66. Thus, in the examples of FIGS. 6 and 7, the mixing passage 18 may not be included between the injector 66 and the combustion chamber 30. Thus, fuel from the injector 66 may be injected directly into the combustion chamber 30. However, the gasses in the combustion chamber 30 may be pre-cooled prior to combustion with the fuel injected from the injector, by circulating the gasses through the cooled air conduit 202 positioned above the combustion chamber 30. Thus, by circulating the gasses through the cooled air conduit 202, the gasses may dissipate heat to the cylinder head (e.g., cylinder head 16 described above in FIG. 1), and thus the temperature of the gasses in the combustion chamber 30 may be reduced.

Focusing on FIG. 6, it shows a side, cross-sectional view 600 of the combustion chamber 30, where the cooled air conduit 202 is coupled to the combustion chamber 30 at both the first end 236 and second end 238. The second end 238 of the cooled air conduit 202 may be coupled to the combustion chamber 30 more proximate the fuel injector 66 and cylinder walls 32 than the first end 236. Thus, the first end 236 may be coupled to the combustion chamber 30 more proximate the central axis of the combustion chamber 30. The cooled air conduit 202 may be coupled at the first and second ends 236 and 238 to the combustion chamber 30 at the fire deck 19. Thus, the cooled air conduit 202 may be open to the combustion chamber 30 at the first and second ends 236 and 238.

The injector 66 may extend into the combustion chamber 30, such that the injection orifices 272 are positioned within and/or flush with the combustion chamber 30. In this way, fuel may be injected directly into the combustion chamber 30 from the injector 66. The combustion chamber gasses may enter to conduit 202 at the first end 236 and may travel through the conduit 202 towards the second end 238. The temperature of the gasses in the conduit 202 may be reduced as the gasses travel through the conduit 202. Specifically, the conduit 202 may be in physically contact with ambient air and/or the cylinder head, and heat from the combustion chamber gasses may be dissipated to the cylinder head and/or ambient air.

Turning to FIG. 7, it shows a side, cross-sectional view 700 of the combustion chamber where the cooled air conduit 202 is coupled to the combustion chamber 30 at both the first end 236 and second end 238. Further, the injector 66 may be included vertically above the combustion chamber 30, and may be in fluidic communication with the combustion chamber 30 via a recessed cone 702. Thus, in the example of FIG. 7, the recessed cone 702 may be formed at the top of the combustion chamber 30, in the fire deck 19. Thus, the cylinder walls 32 and fire deck 19 may be shaped to form a recessed cone 702 where the injector 66 is coupled to the combustion chamber 30. Thus, the recessed cone 702 may be integrally formed as a part of the cylinder block 14.

The second end 238 of the cooled air conduit 202 may be coupled to the recessed cone 702. In this way, the recessed cone 702 may be similar to the reservoir 226 described above with reference to FIGS. 2A-2C, in that it may hold a portion or all of the cooled combustion chamber gasses that re-enter the combustion chamber 30 from the cooled air conduit 202. Thus, gasses may enter the cooled air conduit 202 via the first end 236, may be cooled in the conduit 202, and then may exit the conduit 202 at the second end 238 and may enter the recessed cone 702. The recessed cone 702 may be integrally formed within a cylinder head (e.g., cylinder head 16 described above in FIG. 1) of the engine in other examples.

Continuing to FIG. 8, it shows a top, cross-sectional view 800 of an example opposed piston engine 810 that may include the mixing passage 18 described above with reference to FIGS. 1-7. The opposed piston engine 810 may include two pistons 836 within a combustion chamber 830 formed by combustion chamber walls 832. In particular, the pistons 836 may translate bi-directionally along the longitudinal axis 296, or to the left and right in FIG. 8, between first side walls 803 of the combustion chamber walls 832. Thus a combustion chamber 830 may be formed between the pistons 836. Further, the pistons 836 may include piston bowls 839, which may be recesses or depressions in the surfaces of the pistons 836 that face one another.

Two fuel injectors 866 may be included to inject fuel into the combustion chamber 830 from second side walls 805 of the combustion chamber 830, the second side walls 805, orthogonal to the first side walls 803. Further, the fuel injectors 866 may be positioned at opposite side walls 805, such that each of the side walls 805 may include one of the fuel injectors 866. Thus, the second side walls 805 may be parallel to the direction of motion of the pistons 836 along the longitudinal axis 296. As such, the fuel injectors 866 may be positioned to inject fuel in a direction substantially orthogonal to the direction of motion of the pistons 836.

The mixing passage 18 may be included between each of the fuel injectors 866 and the combustion chamber 830. Thus, two mixing passages may be included at the second side walls 805 of the combustion chamber 830. In particular, the two fuel injectors 866 may be positioned at the side walls 805 of the combustion chamber 830. Thus, fuel injected by the injectors 866 may pass through the mixing passage 18 before entering the combustion chamber 830.

Thus, the mixing passage 18 and fuel injectors 866 may be positioned exterior to the combustion chamber 830, and/or exterior to the combustion chamber walls 832. In particular, the mixing passage 18 and fuel injectors 866 may be positioned exterior to the sides of the combustion chamber 830, and in particular to exterior of the walls 805. The mixing passage 18 may be in fluidic communication with the combustion chamber 830 via an opening at walls 805, formed with an end of the mixing passage 18.

In some examples, the mixing passages may be built into the combustion chamber walls 832 of the combustion chamber 830. In particular, the mixing passages may be integrally formed within the side walls 805. As such, the mixing passages may not be coupled to the same sides of the combustion chamber 830 as intake and/or exhaust valves of the combustion chamber 830.

The bowls 839 of the pistons 836 may be sized and shaped such that they do not overlap with one another along the lateral axis 294. Said another way, when the pistons 836 are at or near their closest approach with one another, leading edges 841 of the bowls 839 may overlap one another such that gasses do not flow between the bowls 839 of the two pistons 836. Thus, the reacting spray from one of the bowls 839 may not reach the other bowl.

Further, as shown in FIG. 8, the bowls 839 are shaped such that the fuel and/or air mixture exiting the mixing passage 18 is retained within the bowls 839, proximate a center of the combustion chamber 830. Further, colder ambient gases proximate the walls 832 may be pushed into the cooled air conduit 202 (not shown in FIG. 8) that feeds the fuel spray conduit 220 (not shown in FIG. 8).

Figure 9:
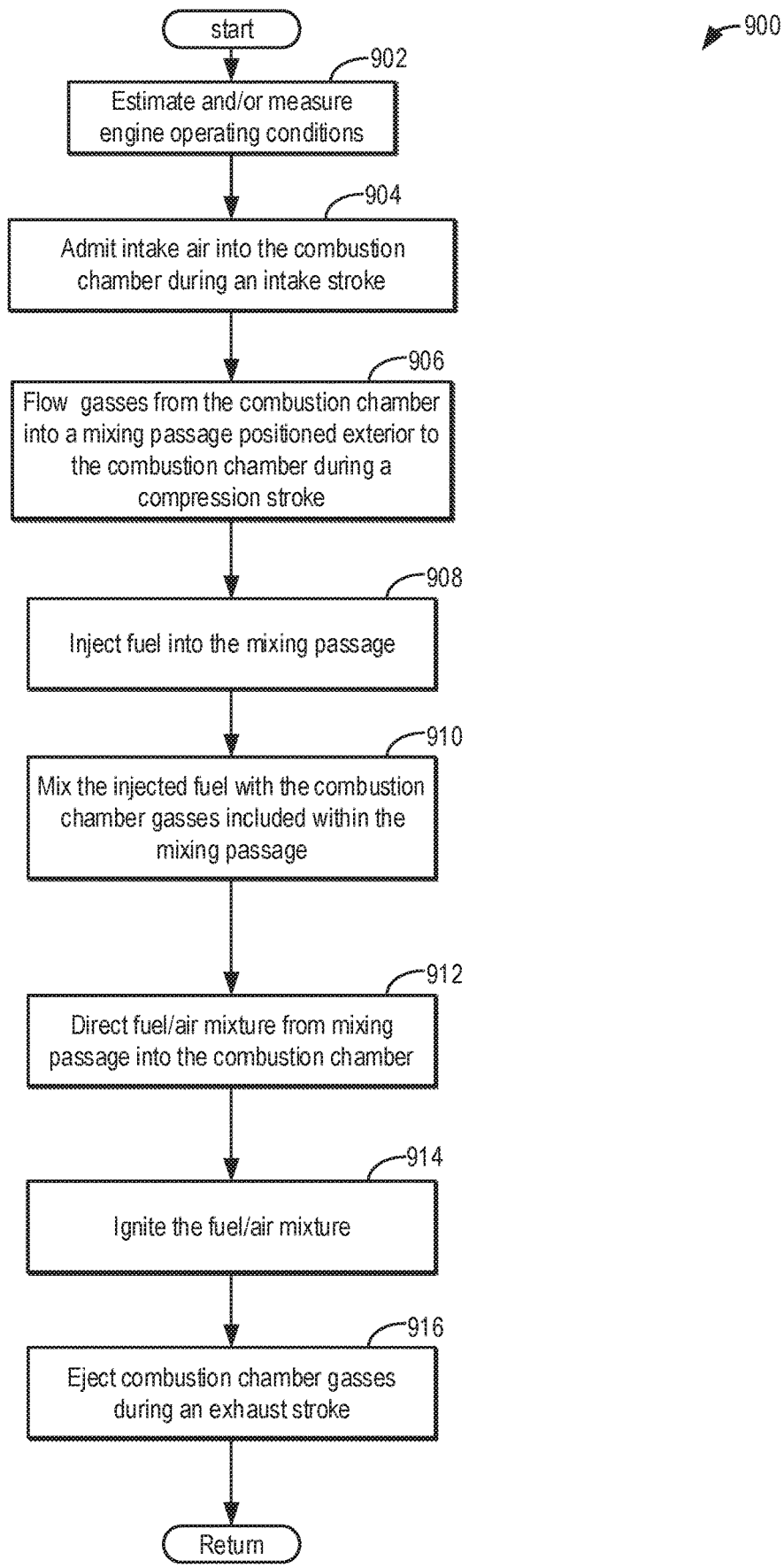
FIG. 9 shows a flow chart of an example method for cooling combustion chamber gasses during a combustion cycle of an engine, in accordance with an embodiment of the present disclosure.

Turning now to FIG. 9, it shows an example method 900 for controlling a combustion cycle of an engine (e.g., engine 10 described above in FIG. 1) including a mixing passage (e.g., mixing passage 18 described above in FIGS. 1-8) positioned exterior to a combustion chamber (e.g., combustion chamber 30 shown in FIGS. 1-4 and FIGS. 6-7).

Method 900 begins at 902 which comprises estimating and/or measuring engine operating conditions. Engine operating conditions may include a driver demanded torque, an intake mass airflow rate, a desired fuel injection amount, a fuel rail pressure, an engine temperature, engine speed, fuel injection timing, etc.

Method 900 then continues from 902 to 904 which comprises admitting intake air into the combustion chamber during an intake stroke. Specifically, the method 900 at 904 may comprise admitting intake air from an intake manifold (e.g., intake manifold 144 described above in FIG. 1) into the combustion chamber during an intake stroke. For example, the method 900 at 902 may comprise opening one or more intake valves (e.g., intake valves 152 described above in FIG. 1) and admitting intake air from the intake manifold during the intake stroke while a piston (e.g., piston 36 described above in FIGS. 1-3C) of the combustion chamber travels away from TDC towards BDC.

Method 900 then continues from 904 to 906 which comprises flowing gasses from the combustion chamber into the mixing passage positioned exterior to the combustion chamber. In particular, the method 900 at 906 may comprise flowing a portion or all of the gasses in the combustion chamber into the mixing passage during all or a portion of a compression stroke. For example, as the piston translates away from BDC and towards TDC during the compression stroke, the piston may push gasses from the combustion chamber into the mixing passage. In particular the method 900 at 906 may comprise only flowing gasses in the combustion chamber from the combustion chamber through one or more of an outer first cooling passage (e.g., cooled air conduit 202 described above in FIGS. 2A-4, and FIGS. 6-7) and/or a central second cooling passage (e.g., central air conduit 222 described above in FIGS. 2A-4 and FIGS. 6-7) of the mixing passage. Further, the method 900 at 906 may comprise flowing gasses from the combustion chamber out of the combustion and into the mixing passage, where the mixing passage is positioned external to the combustion chamber. In some examples, the method 900 at 904 may comprise flowing gasses out of the combustion chamber via one or more openings (e.g., openings 232 and 236 described above in FIGS. 2A-7) in a fire deck (e.g., fire deck 19 described above in FIGS. 1-4 and 6-7) of the combustion chamber. Thus, the method 900 at 906 may comprise flowing combustion chamber gasses at squish regions (e.g., squish regions 246 and 248 described above in FIGS. 2A-2C) of the combustion chamber, out of the combustion chamber, and into the mixing passage. More specifically, the method 900 at 906 may comprise flowing gasses included between a piston rim (e.g., lip 241 described above in FIGS. 2A-3C) and the fire deck into the first cooling passage of the mixing passage, and flowing gasses included between a piston pip (e.g., pip 237 described above in FIGS. 2A-3C) and the fire deck into the second cooling passage of the mixing passage. The combustion chamber gasses may comprise the intake air admitted from the intake manifold during the intake stroke.

Further, the method 900 at 906 may comprise cooling the intake gasses. In particular, as described above with reference to FIGS. 2A-7, the mixing passage may be positioned exterior to the combustion chamber, in a cylinder head (e.g., cylinder head 16 described above in FIGS. 1 and 3B). Thus, cooling the intake gasses may include dissipating head to the cylinder head as the intake gasses pass flow through the mixing passage.

Further, the method 900 at 906 may comprise flowing coolant through the cylinder head. In particular, the method 900 at 906 may comprise flowing coolant between conduits of the mixing passage. For example, the method 900 at 906 may comprise flowing coolant through partitions separating the conduits of the mixing passage (e.g., partitions 260 described above in FIG. 2A). By flowing coolant between the conduits of the mixing passage, heat transfer from the mixing passage, and thus cooling of the gasses included in the mixing passage may be increased.

After flowing gasses from the combustion chamber into the mixing passage at 906, method 900 may then continue from 906 to 908 which comprises injecting fuel into the mixing passage. In particular, an amount of fuel to be injected may be determined based on one or more of a driver demanded torque, a desired air/fuel ratio, mass airflow rate, etc. Further, the injection timing may be adjusted based on engine operating conditions. In particular, the fuel may be injected towards the combustion chamber. In some examples, the fuel may be injected substantially parallel to and/or in line with a fuel spray conduit (e.g., fuel spray conduit 220 described above in FIGS. 2A-7) of the mixing passage.

Method 900 may then continue from 908 to 910 which comprises mixing the injected fuel with the combustion chamber gasses included within the mixing passage (e.g., the combustion chamber gasses admitted into the mixing passage during the compression stroke). In particular, the method may comprise mixing the injected fuel and combustion chamber gasses in the fuel spray conduit of the mixing passage. Thus, the method 900 at 910 comprises mixing the injected fuel and the combustion chamber gasses in the mixing passage, exterior to the combustion chamber.

Method 900 then continues from 910 to 912 which comprises directing the fuel/air mixture from the mixing passage and into the combustion chamber. In particular, the method 900 at 912 may comprise flowing the fuel/air mixture in the fuel spray conduit into the combustion chamber via a third opening (e.g., 228 described above in FIGS. 2A-3C) in the fire deck. More specifically, the fuel/air mixture may be flowed into a re-entrant bowl region (e.g., re-entrant region 243 described above in FIGS. 2A-3C) of the combustion chamber. The fuel/air mixture may be flowed into the combustion chamber during one or more of the compression stroke and/or power stroke.

Method 900 may then continue from 912 to 914 which comprises igniting the fuel/air mixture in the combustion chamber. In some examples, the fuel/air mixture may spontaneously combust due to temperatures and pressure in the combustion chamber. In other examples, the fuel/air mixture may be ignited by a glow plug (e.g., glow plug 92 described above in FIG. 1).

Method 900 may then continue from 914 to 916 which comprises ejecting the gasses in the combustion chamber during an exhaust stroke. In particular the method 900 at 916 may comprise opening one or more exhaust valves (e.g., exhaust valves 154 described above in FIG. 1) and ejecting the combustion chamber gasses to an exhaust manifold (e.g., exhaust manifold 148 described above in FIG. 1). The method 900 at 916 may comprise only ejecting the gasses in the combustion chamber to the exhaust manifold during an exhaust stroke of the piston. Method 900 then returns.

In this way, a technical effect of reducing soot production is achieved by including a mixing passage that reduces a temperature of gasses that initially mix with injected fuel. The temperature of gasses initially entrained by and/or mixing with an injected fuel spray may be reduced by flowing the gasses out of a combustion chamber and through the mixing passage prior to fuel injection, where heat from the gasses may be dissipated to ambient air and/or a cylinder head while traveling through the mixing passage, exterior to the combustion chamber. The colder gasses may increase an amount of air entrained by the fuel prior to combustion. By increasing air-entrainment of fuel, a more homogenous mixture of fuel and combustion chamber gasses may be provided to the combustion chamber, and soot production during the combustion cycle may be reduced. In some examples, the frequency at which a particulate filter is regenerated may be reduced by reducing soot production, thus reducing fuel consumption and increasing the longevity of the particulate filter. In further examples, soot production may be reduced to sufficiently low levels such that the particulate filter may not be included, thus reducing the cost and complexity of the exhaust system.

In one representation a cooling passage for an internal combustion engine may be positioned exterior to a cylinder bore and may be coupled to the cylinder bore at a first opening for receiving gasses from the cylinder bore, and may further be coupled to the cylinder bore at a second opening for returning the gasses received from the cylinder bore via the first opening, back to the cylinder bore. The cooling passage may be in fluidic communication with a fuel injector, where the cooling passage may be positioned between the fuel injector and the cylinder bore such that fuel ejected from the fuel injector passes through the cooling passage en route to the cylinder bore. In any one or more combinations of the above examples of the cooling passage, the cooling passage may comprise a cooled air conduit and a fuel spray conduit, where the cooled air conduit may be coupled at a first end to the first opening and at an opposite second end to the fuel spray conduit for directing combustion chamber gasses from the cylinder bore to the fuel spray conduit, and where a first end of the fuel spray conduit may be coupled to the second opening and an opposite second end of the fuel spray conduit may be positioned in front of a fuel injector, for directing one or more of fuel from the fuel injector and gasses from the cooled air conduit into the cylinder bore. In any one or more combinations of the above examples of the cooling passage, first end of the cooled air conduit and first opening may be positioned vertically above a lip of a reciprocating piston positioned within the cylinder bore, where the lip may be formed around a circumference of a top surface of the piston. In any one or more combinations of the above examples of the cooling passage the cooling passage may further include a central air conduit that may be coupled at a first end to a third opening in the cylinder bore and at an opposite second end to the fuel spray conduit for directing gasses from the cylinder bore to the fuel spray conduit, where the third opening of the central air conduit may be positioned vertically above a pip of a reciprocating piston positioned within the cylinder bore, the pip formed at a center of a top surface of the piston. In any one or more combinations of the above examples of the cooling passage the first end of the fuel spray conduit and second opening may be positioned vertically above a bowl of a reciprocating piston positioned within the cylinder bore, where the bowl may be positioned between a lip and pip of a top surface of the piston, and where the bowl is recessed relative to the lip and pip such that a greater volume exists between the bowl and the second opening than between the lip and the first opening. In any one or more combinations of the above examples of the cooling passage the fuel spray conduit may include one or more surface features that are raised from interior surfaces of walls of the fuel spray conduit. In any one or more combinations of the above examples of the cooling passage, the cooling passage may be integrally formed and included within a cylinder head of the engine. In any one or more combinations of the above examples of the cooling passage, the cooling passage may be integrally formed and included within a cylinder block of the engine, where the cylinder block includes the cylinder bore. In any one or more combinations of the above examples of the cooling passage, the cooling passage may be integrally formed and included within a fuel injector, the cooling passage forming a portion of a housing of the fuel injector. In any one or more combinations of the above examples of the cooling passage, the cooling passage may be positioned vertically above the cylinder bore and vertically above a reciprocating piston positioned within the cylinder bore, such that the cooling passage may be vertically above the cylinder bore during an entire stroke of the piston. In any one or more combinations of the above examples of the cooling passage, the cooling passage may be positioned exterior to a side wall of the cylinder bore, where the side wall of the cylinder bore may be substantially parallel to a direction of motion of a reciprocating piston positioned therein.

In another representation, a method may comprise admitting intake gasses from an intake manifold into a combustion chamber during an intake stroke via opening one or more intake valves, and flowing at least a portion of the intake gasses out of the combustion chamber and into a mixing passage fluidly coupled to the combustion chamber during a compression stroke. In another example, the method may additionally comprise, injecting fuel into the mixing passage towards the combustion chamber. Any one or more combinations of the above methods may further comprise returning the intake gasses to the combustion chamber from the mixing passage. Any one or more combinations of the above methods may further comprise, flowing coolant past the mixing passage. In any one or more combinations of the above methods, the flowing the intake gasses out of the combustion chamber and into the mixing passage may comprise flowing the intake gasses through one or more of a first opening formed in a fire deck of the combustion chamber positioned above an outer lip of a piston of the combustion chamber and into an outer first conduit of the mixing passage and through a second opening formed in the fire deck positioned above a central pip of the piston and into a central second conduit of the mixing passage.

In another representation, an engine may comprise a combustion chamber and a heat dissipation conduit, where the heat dissipation conduit may be fluidly coupled to the combustion chamber and positioned exterior to the combustion chamber for flowing gasses in the combustion chamber out and away from the combustion chamber towards a fuel injector. In the above example engine, the heat dissipation conduit may be coupled at a first end to a fire deck of the combustion chamber, where the first end may form a first opening in the fire deck that provides fluidic communication between the combustion chamber and the heat dissipation conduit. In any one or more combinations of the above examples of the engine the heat dissipation conduit may be coupled at a second end to the fire deck, where the second end may form a second opening in the fire deck that provides fluidic communication between the combustion chamber and the heat dissipation conduit, the second opening positioned more proximate the fuel injector of the combustion chamber than the first opening. In any one or more combinations of the above examples of the engine, the engine may further comprise a fuel spray conduit positioned exterior to the combustion chamber and coupled at a first end to the fire deck, the first end of the fuel spray conduit may form a third opening in the fire deck above a bowl of a reciprocating piston positioned within the combustion chamber, where the fuel spray conduit may be positioned between the fuel injector and the combustion chamber such that fuel injected from the fuel injector flows through the fuel spray conduit before entering the combustion chamber. In any one or more combinations of the above examples of the engine, the heat dissipation conduit may be coupled at a second end to the fuel spray conduit such that the heat dissipation conduit may provide fluidic communication between the combustion chamber and the fuel spray conduit.

In another representation, an engine may comprise, a combustion chamber, an intake manifold fluidly communicating with the combustion chamber via one or more intake valves, an exhaust manifold fluidly communicating with the combustion chamber via one or more exhaust valves, a fuel injector, and a mixing passage coupled and open to the combustion chamber for receiving gasses from the combustion chamber, the mixing passage positioned exterior to the combustion chamber. The mixing passage may be positioned between the fuel injector and the combustion chamber, such that fuel injected by the fuel injector passes through the mixing passage before entering the combustion chamber. In any one or more combinations of the above examples of the engine, the mixing passage may include a cooled air conduit and a fuel spray conduit, where the cooled air conduit may be coupled at a first end to the combustion chamber, the first end of the cooled air conduit comprising a first opening in the combustion chamber, and at an opposite second end to the fuel spray conduit for directing gasses from the combustion chamber to the fuel spray conduit, and where the fuel spray conduit may be coupled at a first end to the combustion chamber, the first end of the fuel spray conduit comprising a second opening in the combustion chamber, and at an opposite second end to the fuel injector for directing fuel injected by the fuel injector from the fuel spray conduit to the combustion chamber via the second opening.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising
   a cooling passage for an engine positioned exterior to a cylinder bore and coupled to the cylinder bore at a first end, forming a first opening in the cylinder bore for receiving gasses from the cylinder bore, where the cooling passage is further coupled to the cylinder bore at a second end, forming a second opening in the cylinder bore for returning the gasses received from the cylinder bore via the first opening, back to the cylinder bore, wherein the cooling passage comprises a cooled air conduit, a fuel spray conduit, and a central air conduit, the cooled air conduit coupled at a first end to the cylinder bore and at an opposite second end to the fuel spray conduit for directing combustion chamber gasses from the cylinder bore to the fuel spray conduit, and where a first end of the fuel spray conduit is coupled to the cylinder bore and an opposite second end of the fuel spray conduit is positioned in front of a fuel injector such that a fuel spray axis is parallel to a central axis of the fuel spray conduit, for directing one or more of fuel sprays from the fuel injector and gasses from the cooled air conduit into the cylinder bore.

2. The system of claim 1, wherein the cooling passage further comprises a cone-shaped reservoir formed at a top of the mixing passage.

3. The system of claim 1, wherein a tip of the fuel injector extends into the cone-shaped reservoir.

4. The system of claim 1, wherein an exterior wall of the cooled air conduit defines at least a portion of a housing of the cooling passage.

5. The system of claim 1, wherein the cooling passage is a single, cylindrical passage.

6. The system of claim 1, wherein the fuel spray conduit is one of a plurality of fuel spray conduits symmetrically arranged about the central axis conduit, and where the cooling passage is biased and arranged proximally to only one of the plurality of fuel spray conduits.

7. A system for an engine, comprising;
   a cooling passage positioned exterior to a cylinder bore to provide fluidic communication between a fuel injector and a combustion chamber, the cooling passage coupled to the cylinder bore at a first end, forming a first opening in the cylinder bore for receiving gasses from the cylinder bore, and further coupled to the cylinder bore at a second end, forming a second opening in the cylinder bore for returning the gasses received from the cylinder bore via the first opening, back to the cylinder bore, the cooling passage including:
   a cone-shaped reservoir formed at a top of the cooling passage, in fluidic communication with a fuel injector;
   a fuel spray conduit coupled at one end to the cylinder bore and at an opposite end to an orifice of the fuel injector via the reservoir such that a central axis of the fuel spray conduit is parallel to a direction of fuel spray from the injector;
   a cooled air conduit coupled at one end to the cylinder bore and at an opposite end to the fuel spray conduit; and
   a central air conduit coupled at one end to the cylinder bore and at an opposite end to the reservoir.

8. The system for the engine of claim 7, wherein the fuel injector includes a cylindrical barrel and wherein the central air conduit is parallel to a central axis of the cylindrical barrel.

9. The system for the engine of claim 7, wherein each of the fuel spray conduit, cooler air conduit, and central air conduit are arranged between the fuel injector and a fire deck.

10. The system for the engine of claim 7, wherein the fuel spray conduit comprises a central axis aligned with the direction of fuel spray from the injector.

11. The system for the engine of claim 7, wherein the central air conduit and the cooler air conduit are shaped to receive combustion chamber gases from the combustion chamber, and where the central air conduit receives combustion chamber gases from a portion of the combustion center closer to a central axis of the combustion chamber than the cooler air conduit.

12. The system for the engine of claim 7, wherein the fuel spray conduit is one of a plurality of fuel spray conduits, and where each fuel spray conduit of the plurality of fuel spray conduits is equally spaced from the central air conduit, and where the each of the plurality of fuel spray conduits are unevenly spaced from the cooler air conduit.

13. The system for the engine of claim 7, wherein combustion chamber gases flow from the combustion chamber, through one or more of cooler air conduit and central air conduit to the cone-shaped reservoir, and return to the combustion chamber via the fuel spray conduit during a fuel injection.

14. The system for the engine of claim 7, wherein the cooler air passage is more distal to a central axis of the combustion chamber than each of the fuel spray conduit and central air conduit.

15. An engine comprising:
a fuel injector located in a cylinder head comprising a fuel spray conduit aligned with each orifice of a plurality of fuel injector orifices arranged in a nozzle of the fuel injector, the fuel spray conduit oblique to a central axis of the fuel injector and a central axis of a combustion chamber;
a central passage arranged radially interior to the fuel spray conduit, the central passage comprising a central axis aligned with the central axis of the combustion; and
a cooler air passage arranged radially exterior to the fuel spray conduit, wherein the fuel spray conduit, the central passage, and cooler air passage are positioned above a fire deck and shaped to receive combustion chamber gases and inject a fuel mixture directly into the combustion chamber.

16. The engine of claim 15, wherein the fuel spray conduit and central passage are fluidly coupled to a reservoir arranged between the fuel injector and the fuel spray conduit and the central passage.

17. The engine of claim 15, wherein the cooler air passage is a single passage physically coupled to only the fuel spray conduit at a single point.

18. The engine of claim 15, wherein the fuel spray conduit comprises a frustoconical shape symmetrically arranged around the central passage.

19. The engine of claim 15, wherein combustion chamber gases from the cooler air passage mix with combustion chamber gases from the central passage in the fuel spray conduit.

20. The engine of claim 15, wherein the fuel spray conduit is arranged between the cooler air passage.

* * * * *